(12) United States Patent
Wang et al.

(10) Patent No.: US 7,743,233 B2
(45) Date of Patent: Jun. 22, 2010

(54) SEQUENCER ADDRESS MANAGEMENT

(75) Inventors: Hong Wang, Fremont, CA (US);
Gautham N. Chinya, Hillsboro, OR (US); Richard A. Hankins, San Jose, CA (US); Shivnandan D. Kaushik, Portland, OR (US); Bryant Bigbee, Scottsdale, AZ (US); John Shen, San Jose, CA (US); Per Hammarlund, Hillsboro, OR (US); Xiang Zou, Beaverton, OR (US); Jason W. Brandt, Austin, TX (US); Prashant Sethi, Folsom, CA (US); Douglas M. Carmean, Beaverton, OR (US); Baiju V. Patel, Portland, OR (US); Scott Dion Rodgers, Hillsboro, OR (US); Ryan N. Rakvic, Palo Alto, CA (US); John L. Reid, Portland, OR (US); David K. Poulsen, Champaign, IL (US); Sanjiv M. Shah, Champaign, IL (US); James Paul Held, Portland, OR (US); James Charles Abel, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 618 days.

(21) Appl. No.: 11/100,032

(22) Filed: Apr. 5, 2005

(65) Prior Publication Data
US 2006/0224858 A1 Oct. 5, 2006

(51) Int. Cl.
*G06F 9/00* (2006.01)
(52) U.S. Cl. ..................................................... 712/220

(58) Field of Classification Search ................. 712/220
See application file for complete search history.

(56) References Cited

U.S. PATENT DOCUMENTS 4,320,453 A * 3/1982 Roberts et al. .............. 712/246

(Continued)

FOREIGN PATENT DOCUMENTS

DE     10110504 B4     11/2006

(Continued)

OTHER PUBLICATIONS

International Search Report and Written Opinion, International Application No. PCT/US2006/013263, mailing date Oct. 1, 2007, 15 pages.

(Continued)

*Primary Examiner*—Eric Coleman
(74) *Attorney, Agent, or Firm*—David P. McAbee

(57) ABSTRACT

Disclosed are embodiments of a system, methods and mechanism for management and translation of mapping between logical sequencer addresses and physical or logical sequencers in a multi-sequencer multithreading system. A mapping manager may manage assignment and mapping of logical sequencer addresses or pages to actual sequencers or frames of the system. Rationing logic associated with the mapping manager may take into account sequencer attributes when such mapping is performed Relocation logic associated with the mapping manager may manage spill and fill of context information to/from a backing store when re-mapping actual sequencers. Sequencers may be allocated singly, or may be allocated as part of partitioned blocks. The mapping manager may also include translation logic that provides an identifier for the mapped sequencer each time a logical sequencer address is used in a user program. Other embodiments are also described and claimed.

21 Claims, 16 Drawing Sheets

U.S. PATENT DOCUMENTS

| | | | |
|---|---|---|---|
| 5,500,826 A * | 3/1996 | Hsu et al. | 365/230.01 |
| 5,559,977 A * | 9/1996 | Avnon et al. | 712/244 |
| 5,701,450 A * | 12/1997 | Duncan | 712/245 |
| 5,771,365 A * | 6/1998 | McMahan et al. | 712/205 |
| 5,812,741 A * | 9/1998 | Kennedy et al. | 700/248 |
| 5,815,727 A * | 9/1998 | Motomura | 712/1 |
| 5,890,189 A * | 3/1999 | Nozue et al. | 711/100 |
| 5,961,639 A * | 10/1999 | Mallick et al. | 712/242 |
| 6,209,066 B1 * | 3/2001 | Holzle et al. | 711/153 |
| 6,263,404 B1 * | 7/2001 | Borkenhagen et al. | 711/137 |
| 6,349,363 B2 * | 2/2002 | Cai et al. | 711/129 |
| 6,349,380 B1 | 2/2002 | Shahidzadeh et al. | |
| 6,374,314 B1 * | 4/2002 | Darnell et al. | 710/52 |
| 7,222,346 B2 * | 5/2007 | Lenormand et al. | 718/106 |
| 7,409,694 B2 * | 8/2008 | Forin et al. | 719/331 |
| 7,424,599 B2 * | 9/2008 | Kissell et al. | 712/228 |
| 7,562,362 B1 * | 7/2009 | Paquette et al. | 718/102 |
| 2002/0116587 A1 * | 8/2002 | Modelski et al. | 711/154 |
| 2003/0088756 A1 | 5/2003 | Vishkin | |
| 2003/0149859 A1 * | 8/2003 | Hyduke | 712/21 |
| 2003/0236962 A1 * | 12/2003 | Venkatraman | 711/207 |
| 2005/0022192 A1 * | 1/2005 | Kim | 718/100 |

FOREIGN PATENT DOCUMENTS

| | | |
|---|---|---|
| EP | 0 905 618 A2 | 3/1999 |
| WO | WO 00/57297 A | 9/2000 |
| WO | 2006/108169 A2 | 10/2006 |

OTHER PUBLICATIONS

International Preliminary Report on Patentability, International Application No. PCT/US2006/013263, mailing date Oct. 18, 2007, 8 pages.

IBM Corp. "Message Passing Between Dynamically Relocatable Tasks", IBM Technical Disclosure Bulletin, vol. 30, No. 8, New York, XP002409336, Jan. 1, 1988, pp. 1-6.

Del Cuvillo J., et al., "Tiny Threads: A Thread Virtual Machine for the Cyclops64 Cellular Architecture", Proceedings 19th IEEE International Parallel and Distributed Processing Symposium, 2005. Denver, Co., XP010785883, Apr. 4, 2005, sections 3-4.

Keckler S. W., et al., "Exploiting Fine Grain Thread Level Parallelism on the Mit Multi-aluprocessor", Proceedings of the 25th Annual International Symposium on Computer Architecture, Los Alamitos, Ca., XP000849926 IEEE Computer Soc., Jun. 27, 1998, pp. 306-317.

* cited by examiner

| Physical Sequencer Frames | |
|---|---|
| 0 | |
| 1 | |
| 2 | |
| 3 | |
| 4 | |
| 5 | |
| 6 | |
| 7 | |
| 8 | |
| 9 | |
| 10 | |
| 11 | |

AA. Twelve sequencer frames available

| Physical Sequencer Frames | |
|---|---|
| 0 | A0 |
| 1 | A1 |
| 2 | A2 |
| 3 | |
| 4 | |
| 5 | |
| 6 | |
| 7 | |
| 8 | |
| 9 | |
| 10 | |
| 11 | |

AB. Assign Thread A

| Physical Sequencer Frames | |
|---|---|
| 0 | A0 |
| 1 | A1 |
| 2 | A2 |
| 3 | B0 |
| 4 | B1 |
| 5 | B2 |
| 6 | |
| 7 | |
| 8 | |
| 9 | |
| 10 | |
| 11 | |

AC. Assign Thread B

| Physical Sequencer Frames | |
|---|---|
| 0 | A0 |
| 1 | A1 |
| 2 | A2 |
| 3 | B0 |
| 4 | B1 |
| 5 | B2 |
| 6 | C0 |
| 7 | C1 |
| 8 | C2 |
| 9 | C3 |
| 10 | |
| 11 | |

AD. Assign Thread C

Backing Store 1275

| Physical Sequencer Frames | |
|---|---|
| 0 | A0 |
| 1 | A1 |
| 2 | A2 |
| 3 | |
| 4 | |
| 5 | |
| 6 | C0 |
| 7 | C1 |
| 8 | C2 |
| 9 | C3 |
| 10 | |
| 11 | |

AE. Swap Out Thread B

| Physical Sequencer Frames | |
|---|---|
| 0 | A0 |
| 1 | A1 |
| 2 | A2 |
| 3 | D0 |
| 4 | D1 |
| 5 | D2 |
| 6 | C0 |
| 7 | C1 |
| 8 | C2 |
| 9 | C3 |
| 10 | D3 |
| 11 | |

AF. Assign Thread D

*FIG. 7*

| Valid | Virtual Page | Page Frame # |
|---|---|---|
| 1 | 140 | 31 |
| 1 | 20 | 29 |
| 1 | 130 | 27 |
| 1 | 129 | 32 |
| 1 | 19 | 18 |
| 1 | 21 | 3 |

Control Register 1120

*FIG. 11*

SEQUENCER ADDRESS MANAGEMENT

BACKGROUND

1. Technical Field

The present disclosure relates generally to information processing systems and, more specifically, to logical sequencer address translation and management in a multi-sequencer system.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, superscalar execution, out-of-order execution, and caches. Many such approaches have led to increased transistor count, and have even, in some instances, resulted in transistor count increasing at a rate greater than the rate of improved performance.

Rather than seek to increase performance strictly through additional transistors, other performance enhancements involve software techniques. One software approach that has been employed to improve processor performance is known as "multithreading." In software multithreading, an instruction stream may be divided into multiple instruction streams that can be executed concurrently. Alternatively, multiple independent software streams may be executed in concurrently.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoEMT"), only one thread, at most, is active at a given time.

Increasingly, multithreading is supported in hardware. For instance, in one approach, processors in a multi-processor system, such as a chip multiprocessor ("CMP") system, may each act on one of the multiple software threads concurrently. In another approach, referred to as simultaneous multithreading ("SMT"), a single physical processor is made to appear as multiple logical processors to operating systems and user programs. For SMT, multiple software threads can be active and execute concurrently on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of software threads, such as SMT and/or CMP systems, an operating system application may control scheduling and execution of the software threads on thread execution resource(s). For a system that, instead, allows a user to explicitly control software threads via user-level instructions, such instructions may indicate the name or address of a thread execution resource.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of an apparatus, system and method to manage and translate the mapping of logical sequencer addresses in a multi-sequencer system to physical sequencers.

FIG. 7 is a data flow diagram illustrating at least one embodiment of an example scenario for mapping of actual sequencer frames to virtualized logical sequencer addresses.

FIG. 11 is a block diagram illustrating sample entries for at least one embodiment of a translation acceleration structure.

DETAILED DESCRIPTION

The following discussion describes selected embodiments of methods, systems and mechanisms to manage the mapping of logical sequencer addresses for a multi-sequencer system that supports user-level sequencer arithmetic. The mechanism and method embodiments described herein may be utilized with single-core or multi-core multithreading systems.

In the following description, numerous specific details such as sequencer allocation approaches, multithreading environments, system configurations, numbers and topology of sequencers in a multi-sequencer system, microarchitectural structures, and instruction nomenclature and parameters have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

As used herein, a thread unit, also interchangeably referred to herein as a "sequencer", is a distinct thread execution resource and may be any physical or logical unit capable of executing a thread. It may include next instruction pointer logic to determine the next instruction to be executed for the given thread. A sequencer may be a logical thread unit or a physical thread unit. Such distinction between logical and physical thread units is discussed immediately below in connection with FIG. 1.

Figure 1:
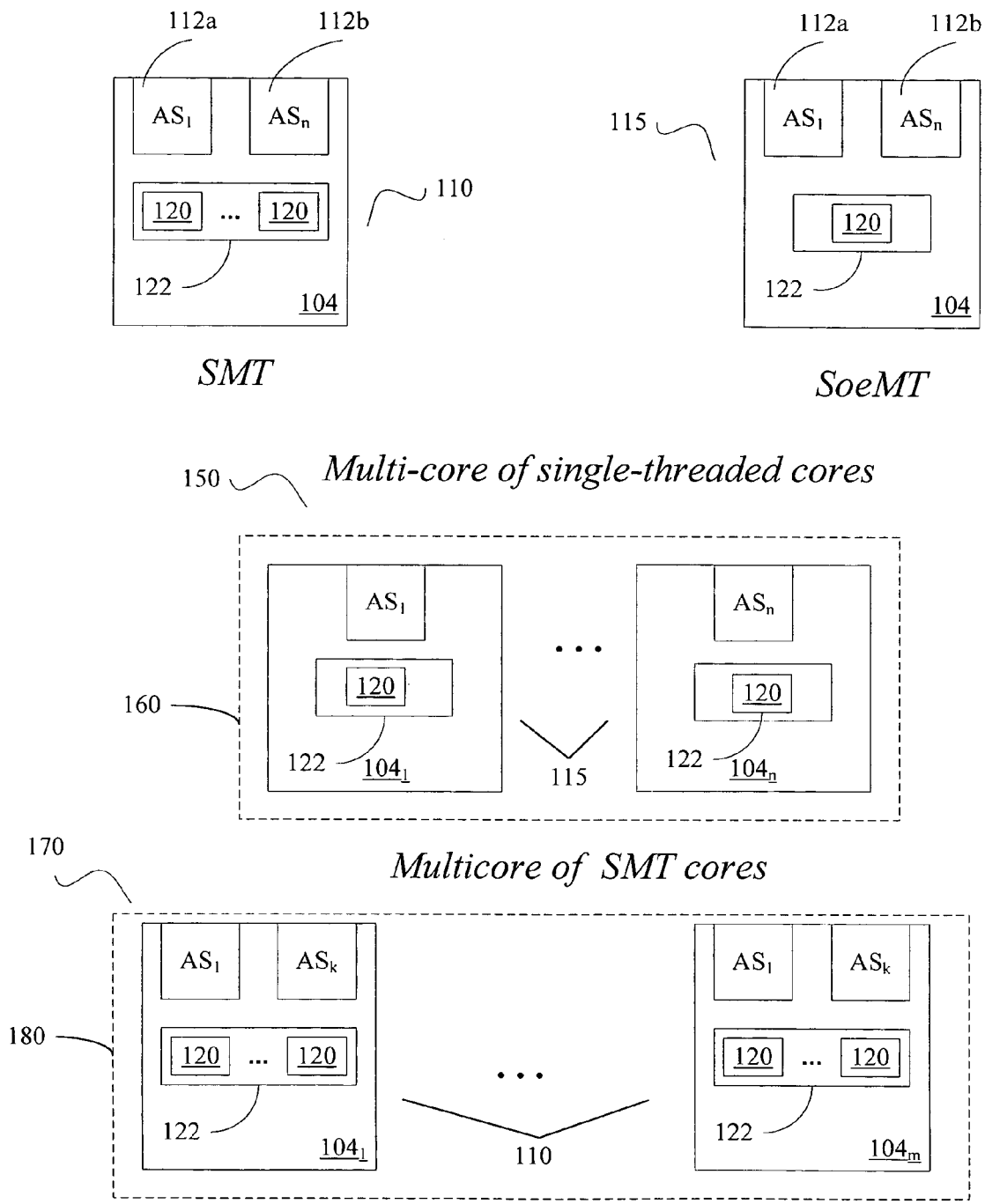
FIG. 1 is a block diagram illustrating various embodiments of multi-sequencer systems.

FIG. 1 is a block diagram illustrating selected features of embodiments 110, 115, 150, 170 of a multi-sequencer system that supports user-level control of threads. FIG. 1 illustrates selected features of an SMT multi-sequencer multithreading system 110, where each sequencer is a logical processor that may execute a thread concurrently with execution of other threads on other logical processors. FIG. 1 also illustrates at least one embodiment of a multi-sequencer system 115 that supports multiple logical sequencers via a switch-on-event (SoeMT) mechanism, such as a time-multiplexing type of switching mechanism, such that each of the logical processors takes turns running its thread—only one thread executes at a time on such system 115.

FIG. 1 also illustrates selected features of multiple-core multithreading systems 150, 170. The physical cores for a multi-core multithreading system may be either single-sequencer cores (see, e.g., system 150) or may be multi-sequencer cores (see, e.g., system 170). Such multi-core multithreading embodiments are discussed later, below, while the single-core multi-sequencer systems 110, 115 are discussed immediately below.

In the SMT system 110, a single physical processor 104 is made to appear as multiple thread contexts, referred to herein as $TC_1$ through $TC_n$ (not shown). Each of the n thread contexts is effectively a sequencer. When at least some of these thread contexts (e.g. m out of n) are made visible to the operating system and/or user programs, these thread contexts are sometimes referred to as logical processors (not shown), and are referred to herein as $LP_1$ through $LP_m$. Each thread context $TC_1$ through $TC_n$ maintains a set of the architecture state $AS_1$-$AS_n$, respectively. The architecture state includes, for at least one embodiment, data registers, segment registers, control registers, debug registers, and most of the model specific registers. The thread contexts $TC_1$-$TC_n$ share most other resources of the physical processor 104, such as caches, execution units, branch predictors, control logic and buses.

Although such features may be shared, each thread context in the multithreading system 110 can independently generate the next instruction address (and perform, for instance, a fetch from an instruction cache, an execution instruction cache, or trace cache). Thus, the processor 104 includes logically independent next-instruction-pointer and fetch logic 120 to fetch instructions for each thread context, even though the multiple logical sequencers may be implemented in a single physical fetch/decode unit 122. For an SMT embodiment, the term "sequencer" encompasses at least the next-instruction-pointer and fetch logic 120 for a thread context, along with at least some of the associated architecture state, AS, for that thread context. It should be noted that the sequencers of an SMT system 110 need not be symmetric. For example, two SMT sequencers of the same physical processor may differ in the amount of architectural state information that they each maintain.

Thus, for at least one embodiment, the multi-sequencer system 110 is a single-core processor 104 that supports concurrent multithreading. For such embodiment, each sequencer is a logical processor having its own instruction next-instruction-pointer and fetch logic and its own architectural state information, although the same physical processor core 104 executes all thread instructions. For such embodiment, the logical processor maintains its own version of the architecture state, although execution resources of the single processor core 104 may be shared among concurrently-executing threads.

FIG. 1 also illustrates an alternative embodiment of a multi-sequencer system 115 that is capable of executing multi-threaded code. The embodiment 115 is labeled as a Switch-on-Event Multithreading ("SOEMT") embodiment. For such embodiment 115, each sequencer is similar to the sequencers of the previous embodiment 110, in that each sequencer is a logical processor having its architectural state information and own instruction next-instruction-pointer. However, the system 115 differs from that 110 discussed above in that the sequencers each share with the other sequencers the same physical fetch logic 120 in a single fetch/decode unit 122 in the physical processor core 104. The fetch logic 120 may be switched to fetch for different sequencers of the system 115 based on a variety of switch-on-event policies. The switch-on-event triggers may be passage of a specific amount of time or machine cycles, such as time-multiplexing (TMUX). For other embodiments, the SOEMT triggers may other events, such as cache-miss events, page faults, long-latency instructions, etc.

FIG. 1 also illustrates at least two embodiments of multi-core multithreading systems 150, 170. For at least some embodiments of the multi-core system 150, 170 illustrated in FIG. 1, the system may use a processor 104 as a building block. Each of the sequencers may be a processor core 104, with the multiple cores $104_1$-$104_n$, $104_1$-$104_m$ residing in a single chip package 160, 180, respectively. For system 150 illustrated in FIG. 1, each core $104_i$ (i=0 to n) may be a single-threaded sequencer. For the system 170 illustrated in FIG. 1, each core $104_j$ (j=1 to m) may be a multi-sequencer processor core.

The chip packages 160, 180 are denoted with broken lines in FIG. 1 to indicate that the illustrated single-chip embodiments of multi-core systems 150, 170 are illustrative only. For other embodiments, processor cores of a multi-core system may reside on separate chips, or may be organized as an SOEMT multi-sequencer system.

A first multi-core multithreading system 150 illustrated in FIG. 1 may include two or more separate physical processors $104^1$-$104_n$ that is each capable of executing a different thread such that execution of at least portions of the different threads may be ongoing at the same time. Each processor $104_1$ through $104_n$ includes a physically independent fetch unit 122 to fetch instruction information for its respective thread. In an embodiment where each processor $104_1$-$104_n$ executes a single thread, the fetch/decode unit 122 implements a single next-instruction-pointer and fetch logic 120.

FIG. 1 also illustrates a multi-core multithreading system 170 that includes multiple SMT systems 110. For such embodiment 170, each processor $104_1$-$104_m$ supports multiple thread contexts. For example, each processor $104_1$-$104_m$ is an SMT processor that supports k sequencers such that the system 170 effectively implements m*k sequencers. In addition, the fetch/decode unit 122 for the system 170 implements distinct next-instruction-pointer and fetch logic 120 for each supported thread context.

For ease of illustration, the following discussion focuses on embodiments of the multi-core system 150. However, this focus should not be taken to be limiting, in that the mechanisms described below may be performed in either a multi-core or single-core multi-sequencer system. Also, either single-core or multi-core systems may be implemented with single-sequencer cores or multi-sequencer cores. For each multi-sequencer core, one or more multithreading techniques may be utilized, including SMT and/or SoeMT. It will be understood that the systems 110, 115, 150, 170 shown in FIG. 1 may include additional features, such as a memory system, execution units, and the like, that are not shown in FIG. 1.

Each sequencer, 104, for the system embodiments 110, 115, 150, 170 illustrated in FIG. 1 may be associated with a unique identifier (discussed below in connection with FIG. 3). Various embodiments of the systems 110, 150 may include a different number, N, of total sequencers.

Embodiments of the systems 110, 115, 150, 170 illustrated in FIG. 1 may each support signaling among sequencers. As used herein, the term "sequencer arithmetic" is used to refer to inter-sequencer signaling for service between two sequencers. Architectural support for sequencer arithmetic may include extensions to an instruction set architecture such that one or more instructions are provided to allow a user direct manipulation of control and state transfers between sequencers. A user-level instruction is said to be "sequencer aware" if it is a sequencer arithmetic instruction or any other type of instruction that includes a logical sequencer address as a parameter, which can be encoded as an instruction operand and/or implicitly referenced upon instruction execution. Such instructions may include sequencer arithmetic instructions that either provide for signaling another sequencer (referred to herein as an "SXFR", or shred transfer, instruction) or provide for setting up a client sequencer to monitor for such a signal (referred to herein as a shred monitor, "SEMONITOR", instruction).

Sequencer aware instructions may also include other instructions that include a logical sequencer address as a parameter, such as sequencer aware state save and restore instruction. Upon execution of such a state save instruction, a first sequencer can create a snapshot copy of the architectural states of a second sequencer. The sequencer aware restore instruction may designate that the save architectural states be loaded to a specified sequencer.

Each sequencer aware instruction may also optionally include more than one logical sequencer addresses as parameters. For example, a sequencer-aware instruction may include as a parameter an aggregate of multiple logical sequencer addresses. Such approach may be utilized for multicasting or broadcasting inter-sequencer signals from one sequencer to multiple other sequencers. In order to simplify the following discussion, examples set forth below may refer, unless otherwise specified, to the uni-casting case: a first sequencer executes a sequencer-aware instruction that specifies a single other logical sequencer address. Such approach is made for descriptive convenience and illustrative purposes only, and should not be taken to be limiting. One of skill in the art will realize that embodiments of the mechanisms discussed herein may be applied to broadcasting and multicasting sequencer-aware instructions as well.

For descriptive convenience, SXFR may be used in the discussion below as the instruction mnemonic for an illustrative inter-sequencer signaling instruction. Similarly, for descriptive convenience and without limitation, SSAVE, SRSTOR are used as instruction mnemonics, respectively, for sequencer-aware architectural state save and restore instructions. One of skill in the art will realize that many other variants and mnemonics of signaling instructions, as well as context save and restore instructions and other sequencer-aware instructions, may be utilized without departing from the scope of the appended claims.

Accordingly, for embodiments of the methods, mechanisms and systems described herein, a user-visible feature of the architecture of the sequencer arithmetic operations is at least a canonical set of instructions that allow a user to cause a signal for service among sequencers. Such signaling may be triggered by an instruction that includes, as a parameter, a name, or logical address, of a sequencer 104 on which a consequent control transfer is performed. As used herein, the sequencer generating a signal for user-level thread control transfer is referred to as a source sequencer and the recipient of the generated signal is referred to herein as a destination sequencer.

Figure 2:
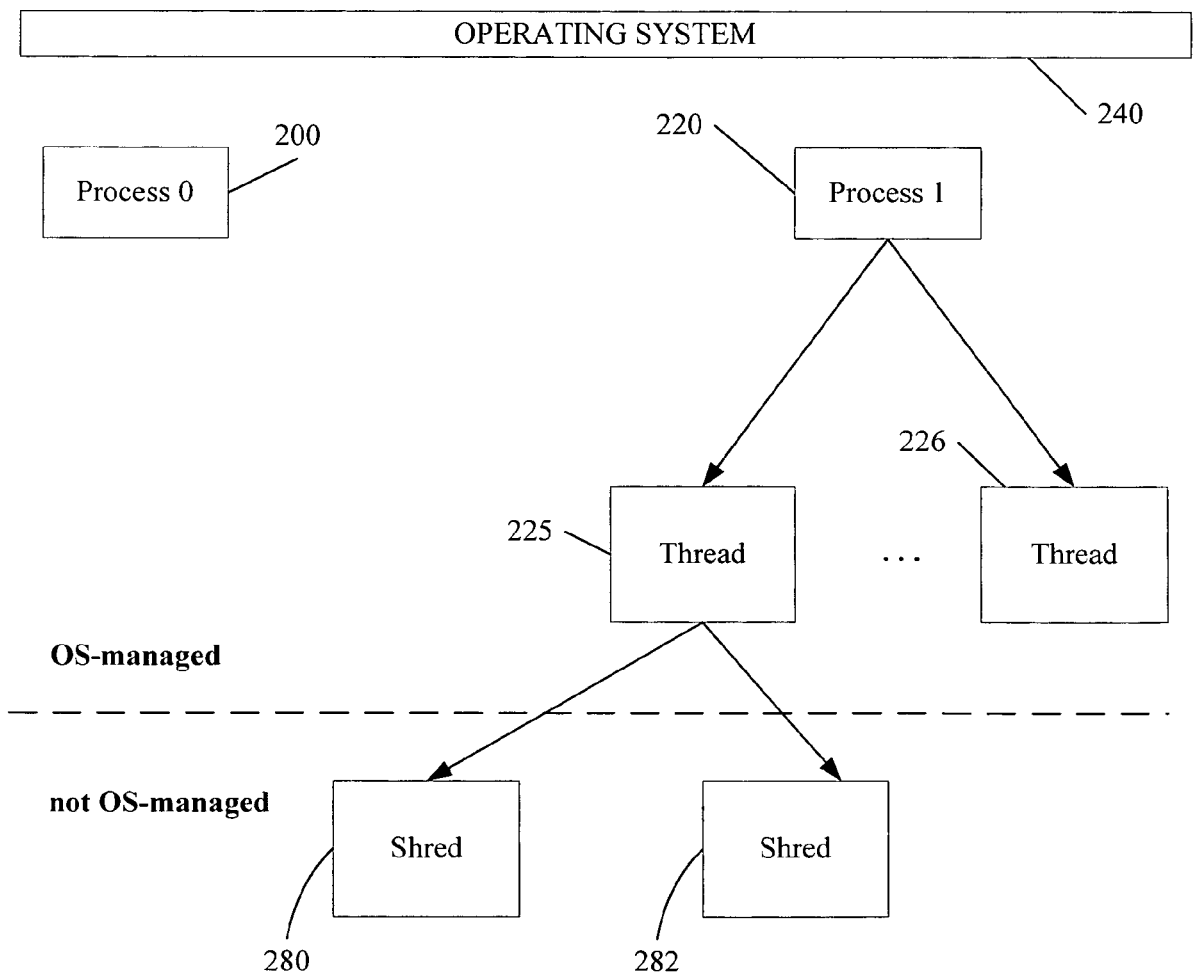
FIG. 2 is a block diagram presenting a graphic representation of a general parallel programming approach for a multi-sequencer system.

Reference is now briefly made to FIG. 2 for a discussion of basic concepts that may be incorporated by at least some embodiments of systems discussed herein. FIG. 2 is a block diagram illustrating a graphic representation of a parallel programming approach on a multi-sequencer multithreading system.

A shared-memory multiprocessing paradigm may be used in an approach referred to as parallel programming. According to this approach, an application programmer may split a software program, sometimes referred to as an "application" or "process," into multiple tasks to be run concurrently in order to express parallelism for a software program. All threads of the same software program ("process") share a common logical view of memory address space.

FIG. 2 illustrates processes 200, 220 visible to an operating system 240. These processes 200, 220 may be different software application programs, such as, for example, a word processing program and an email management program. Commonly, each process operates in a different address space.

The operating system ("OS") 240 is commonly responsible for managing the user-created tasks for a process, such as process 220 illustrated in FIG. 2. Accordingly, the operating system 240 may create a distinct thread 225, 226 for each of the user-defined tasks associated with a process 220, and may map the threads 225, 226 to thread execution resources.

Accordingly, FIG. 2 illustrates user threads 225, 226 that are associated with, and share the same virtual memory address space with, process 220. The threads 225, 226 for process 220 illustrated in FIG. 2 thus represent distinct user-defined tasks. Such threads are sometimes referred to herein as "OS threads", to denote that they are created, managed and scheduled by the OS 240. Alternatively, such threads may also interchangeably be referred to as "user threads" or "user tasks" to refer to the notion of an OS-managed thread representing one user task.

The user threads 225, 226 may be created, managed and scheduled by the OS 240. Regarding scheduling of the user threads 225, 226, the OS 240 may include a scheduler that schedules the threads 225, 226 for execution, and maps each thread 225, 226 to one or more logical sequencer addresses. Accordingly, FIG. 2 illustrates a traditional threading scheme wherein the operating system 240 is responsible for mapping each user thread 225, 226 to a single logical sequencer address. Commonly, the logical sequencer address corresponds to a single sequencer that may, for example, include one distinct next-instruction pointer.

However, FIG. 2 also illustrates a more recent approach to multithreading. FIG. 2 illustrates that a single OS thread, such as thread 225 illustrated in FIG. 2, may be associated with multiple user-level threads, 280 and 282, that may not be created, scheduled, or otherwise managed by the operating system 240. Such threads may be referred to as "shreds", in order to distinguish them from OS threads.

The shreds 280, 282 may not be visible to the scheduler of the OS 240 and therefore the OS 240 usually does not manage when or how the associated OS thread (such as OS thread 225 that is associated with shreds 280 and 282) schedules a shred to run on an assigned logical sequencer address. The OS thread 225 is itself usually responsible to schedule when and how to run one of its shreds 280, 282. Although two such shreds 280, 282 are illustrated in FIG. 2, any number of such shreds may be associated with a single OS thread.

For at least one embodiment, one or more sequencer-aware instructions may be coded by a programmer into the shreds belonging to an OS thread. Such instructions, when executed during operation of the OS thread, may cause creation, control transfer, sequencer arithmetic, context save, context restore or other operations for shreds, without intervention of OS 240 scheduling logic.

Figure 3:
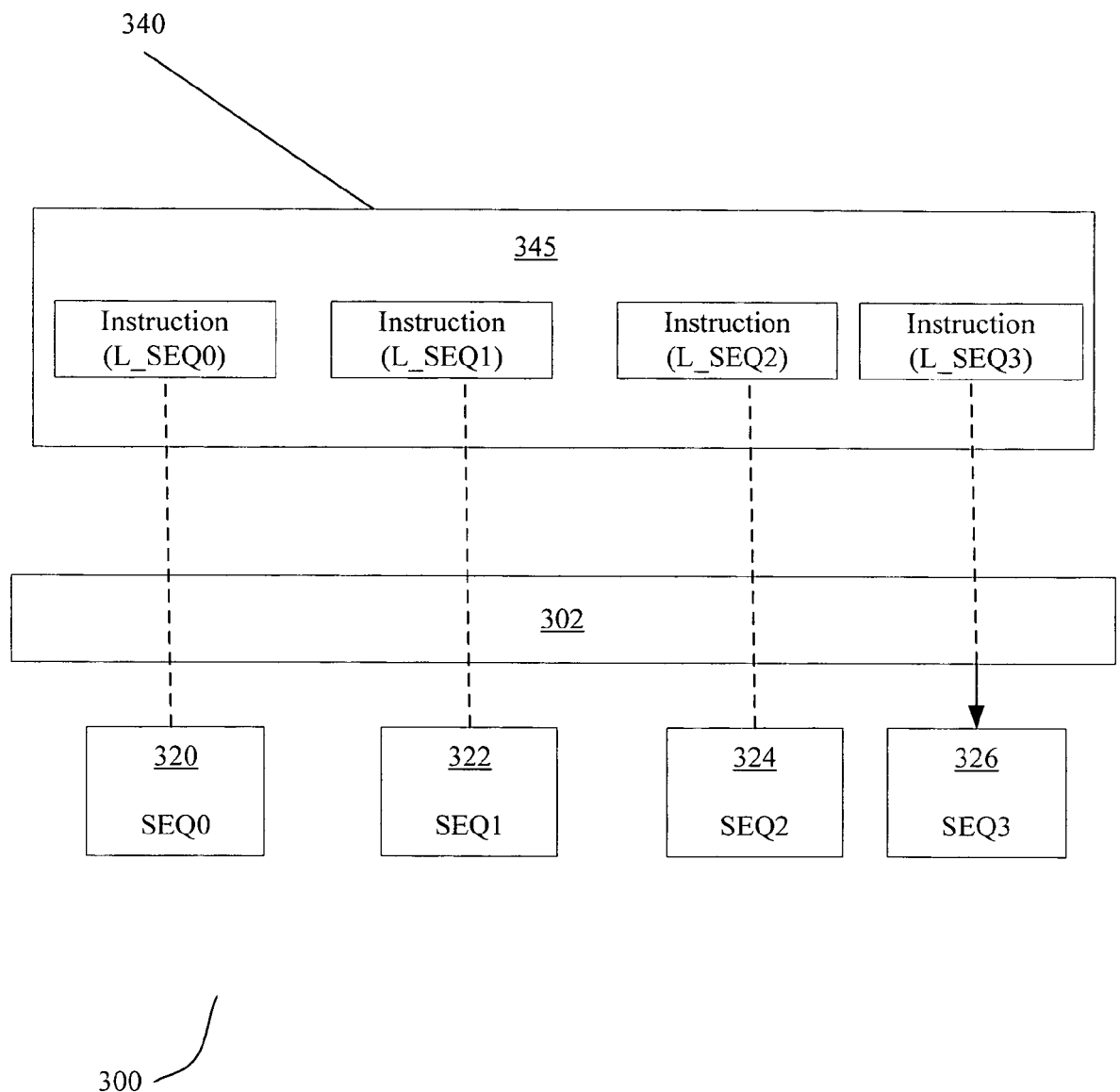
FIG. 3 is a block diagram illustrating at least one embodiment of multi-sequencer system having a unique identifier for each sequencer.

FIG. 3 is a block diagram illustrating at least one embodiment of a multithreading system 300 that includes a plurality of thread execution resources 320, 322, 324, 326, referred to herein as "sequencers." The sequencers 320, 322, 324, 326 may be any type of thread execution resource, including a single-sequencer core, an SMT logical processor (see, e.g., discussion of $TC_1$ through $TC_n$, above in connection with FIG. 1), or an SOEMT core (see, e.g., 115 of FIG. 1), to name a few. All such examples represent hardware features that support execution of one or more threads. As such, any such thread execution resource, including an SMT logical processor, is referred to herein as a "physical sequencer."

FIG. 3 illustrates four physical sequencers, 320, 322, 324, 326. Each of the sequencers 320, 322, 324, 326 is associated with a unique sequencer identifier (SEQ0, SEQ1, SEQ2, SEQ3). One of skill in the art will recognize that the four physical sequencers 320-326 are illustrated in FIG. 3 for purposes of example only, and should not be taken to be limiting. A system that utilizes the techniques described herein may include any number of physical sequencers that are capable of concurrent execution of instructions.

FIG. 3 further illustrates that one or more instructions 345 from a user program 340 provide for user-level sequencer-aware operations. The sequencer-aware instructions 345 include logical sequencer addresses, such as L_Seq0, L_Seq1, L_Seq2, and L_Seq3, to identify sequencers. For the remainder of the following discussion, the terms "logical sequencer address" and "virtual sequencer address" may be used interchangeably.

For at least one embodiment, it is assumed that the instructions 345 of the user program 340 are executed by an OS-managed thread. The program 340 may therefore be interchangeably referred to herein as a thread. Responsive to such instructions 345 (that is, when the instructions 345 are executed), the mapping manager 302 may perform a lookup to determine which physical sequencer 320-326 is identified by the logical sequencer address specified in the instruction 345. For at least one embodiment of the mapping manager 302, the lookup may be implemented in or assisted by hardware or firmware, or by faulting into a software handler at a proper privilege level.

FIG. 3 illustrates an embodiment of the system 300 that provides a somewhat simple virtualization of the logical sequencer addresses. That is, a number of logical sequencer addresses available to the application programmer is statically bound to a limited number of physical sequencers 320-326. FIG. 3 thus illustrates a 1:1 mapping between physical sequencers and the logical sequencer addresses that may be utilized in an application program.

A mapping manager 302 may thus manage the mapping between physical sequencers 320-326 and logical sequencer addresses used by one or more threads 340. For at least one embodiment, the mapping manager 302 is an operating system program or other software application. For such embodiment, the mapping manager 320 may handle the mapping at a privileged level of operation. For example, management of the mapping between actual sequencers and logical sequencer addresses may be handled as a privileged operation by an OS kernel or a driver.

However, alternative embodiments of the mapping manager 320 may manage the mapping at a variety of levels of abstraction. For example, the mapping manager 302 may be an architectural lookup table that may be supported by microarchitectural-level renaming by hardware and/or firmware. For at least one other embodiment, for example, the mapping manager 302 may be a virtualization management software mechanism in a virtual machine or hypervisor. Or, for at least one other embodiment, the mapping manager 302 may be user-level non-privileged software code that performs the mapping manager functionality as part of a user thread (such as, e.g. 225) or process (such as, e.g. 220).

Figure 16:
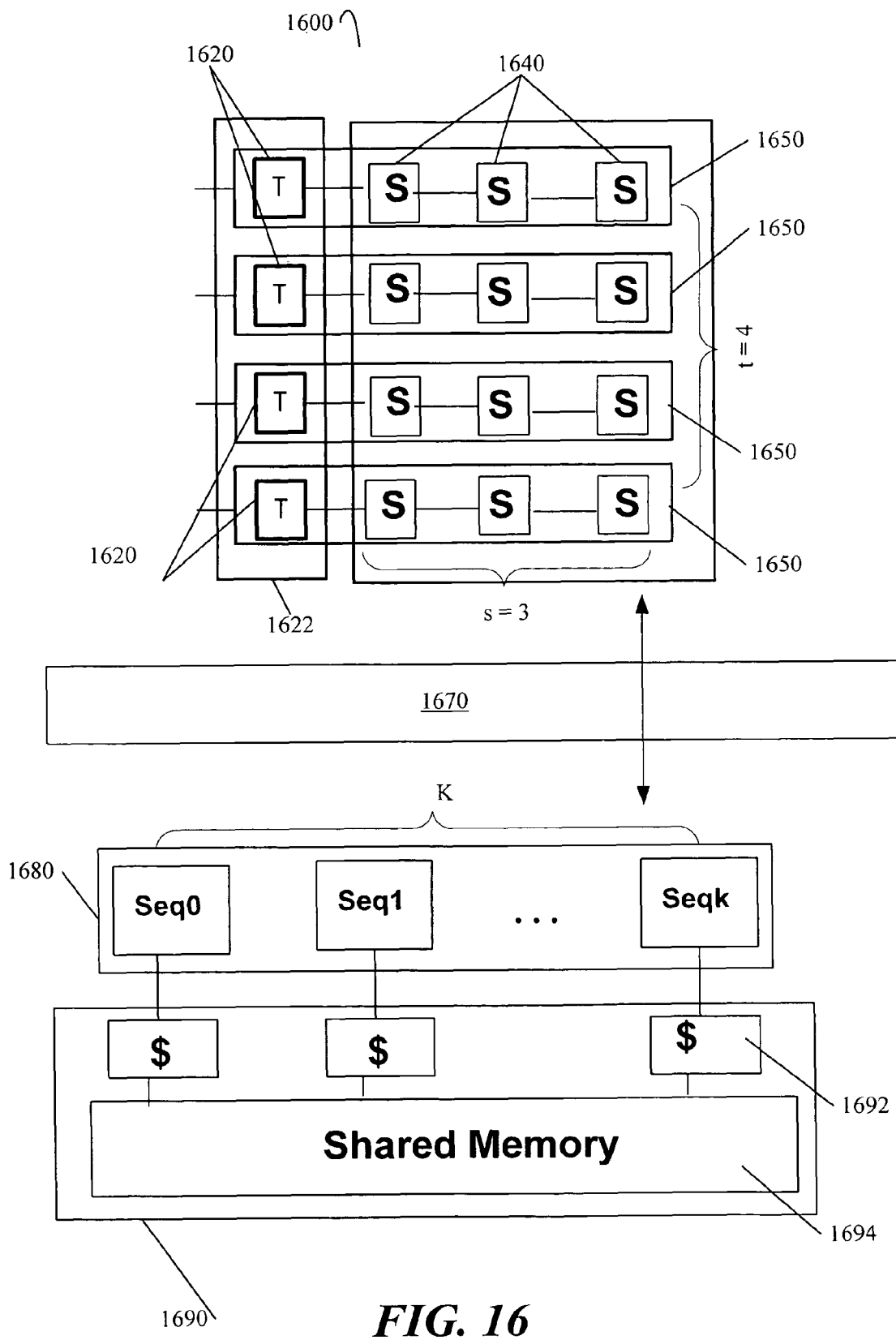
FIG. 16 is a block diagram of another embodiment of a multi-sequencer system that supports user-level sequencer-aware operations.

Reference is now made to FIG. 16, which is a block diagram illustrating certain architectural features for another embodiment of a multi-sequencer system 1600 that supports user-level sequencer-aware operations. FIG. 16 illustrates that the system 1600 includes sequencers 1620, 1640. The number and type of sequencers illustrated in FIG. 16 should not be taken to be limiting. Although only two types of sequencers 1620, 1640 are illustrated, an alternative embodiment of system 1600 may include additional types of sequencers. In addition, the number of each type 1620, 1640 of sequencer illustrated in FIG. 16 should not be taken to be limiting as to upper or lower bound for the number of each sequencer type for alternative embodiments of the system 1600. Both smaller and larger numbers of each sequencer type 1620, 1640 may be utilized.

FIG. 16 illustrates that the system includes (1+s)*t sequencers. While FIG. 16 illustrates a t to (s*t) binding relationship between the first sequencer type, t, (1620), in total, to a second sequencer type, s, (1640), where t=4, s=3, such illustration should not be taken to be limiting. For alternative embodiments, t and s can vary to any numbers such that t>0 and s≧0.

The first sequencer type 1620, which is marked as "T" in FIG. 16 and is referred to herein as a "T-sequencer," can be directly managed by an OS, which may schedule an OS thread to run on the T-sequencer. The second sequencer type 1640, which is marked as "S" in FIG. 16 and is referred to herein as an "S-sequencer," is not directly managed by the OS. Instead, an S-sequencer 1640 may be managed directly by user code in a thread—it can be scheduled directly by the thread to run shreds associated with the thread.

Architecturally, each OS-managed thread may correspond to 1 distinct multi-sequencer ensemble 1650 (referred to herein as a "meta-processor"). Each meta-processor 1650 may include 1 logical T-sequencer 1620 and s logical S-sequencers. FIG. 16 shows t meta-processors, where t=4. Each of the illustrated meta-processors includes s S-sequencers, where s=3. Accordingly, each of the meta-processors 1650 includes s+1 total sequencers (i.e., s S-sequencers plus one T-sequencer). The OS may be responsible for scheduling a thread to a meta-processor 1650, and the thread can further schedule and run its multiple shreds concurrently on the (1+s) sequencers in the meta-processor. FIG. 16 should not be taken to limit the number of meta-processors 1650 for a system, nor to limit the number of S-sequencers 1640 associated with each meta-processor 1650. Specific values for t and s are shown in FIG. 16 for purposes of illustration only.

For a multi-sequencer system that provides support to user-level sequencer-aware operations, such as the embodiments 300, 1600 illustrated in FIGS. 3 and 16, a sequencer is effectively a distinct form of architectural resource. Like register resources, memory resources, and other known common architectural resources, the sequencer resources may have distinct architectural naming space and may be subject to virtualization management.

Architecturally, a sequencer resource may include, without limitation, at least three components: a reference name, a sequencer state context, and a capability descriptor. The capability descriptor may include attribute information about the sequencer, such as scheduling constraints and requirements, as well as other relevant properties such as whether it is T-sequencer or S-sequencer. Architecturally, for any two sequencers in a meta-processor 1650 of (1+s) sequencers, the respective sequencer resources differ in the reference name, and may also differ regarding the context composition and/or the capability descriptor information. For example, it is possible that one sequencer's set of architectural states differ from that of the other sequencer.

For a given meta-processor 1650, the above-mentioned sequencer-aware instructions, such as SXFR, SSAVE and SRTOR, may be defined for all of the (1+s) logical sequencers. That is, the instruction may have one or more of the logical sequencer addresses encoded as operands or may otherwise make reference to one or more of the logical sequencer addresses during instruction execution.

Architecturally, the seemingly static binding of 1 T-sequencer 1620 and s S-sequencers 1640 in a meta-processor 1650 is only logical (or sometimes equivalently called "virtual"). That is, the logical sequencer addresses in a given meta-processor may be statically determined and may range, for example, from 0 to s. However, for purposes of discussing an alternative embodiment, it is noted that FIG. 16 illustrates a system 1600 having execution resources 1680 that include K physical sequencers, Seq 0-Seq k. The sequencers of the execution resources 1680 may each be coupled to an associated cache hierarchy 1692. Although illustrated separately in FIG. 16, one of skill in the art will realize that a cache hierarchy 1692 for a sequencer, Seq 0-Seq k, may include an on-chip cache as well as, or instead of, off-chip caches. FIG. 16 illustrates that each of the sequencers Seq 0-Seq k may also have access to a shared memory that is shared by all sequencers.

Where K>0 and, more commonly, where K≧t, the mapping between (1+s)*t logical sequencers to the K physical sequencers may be dynamically changed during run-time. Consequently, for such embodiments, the exact grouping of physical sequencers corresponding to one or more logical T-sequencers 1620 and the associated one or more other S-sequencers 1640 for one or more meta-processors 1650 may be dynamically changed during run-time.

Dynamic mapping of logical sequencer addresses to physical sequencers may also be referred to as "virtualization." Virtualization of logical sequencer addresses is a technique that allows threads that may need multiple sequencers for execution to execute by means of dynamic physical sequencer allocation. Virtualization of logical sequencer addresses refers to the abstraction of separating logical sequencer addresses—as seen by the thread—from physical sequencer identifiers—physical sequencers as seen by the physical multi-sequencer processor implementation. Because of this separation, the application programmer needs to be aware of only the logical sequencer addresses.

As with the embodiment 300 discussed above in connection with FIG. 3, sequencer-aware instructions for the system 1600 illustrated in FIG. 16 may specify a logical sequencer address for the destination sequencer. However, for at least one embodiment of the system 1600, the logical sequencer address is dynamically mapped to a physical sequencer rather than being statically mapped. The dynamic mapping of logical sequencer addresses to physical sequencers may be managed by a mapping manager 1670. For at least one embodiment, the mapping manager 1670 may be along the lines of mapping manager 302 discussed above in connection with FIG. 3. During execution, the mapping for a logical sequencer address may (or may not) change from one physical sequencer to another.

The mapping manager 1670 may manage various different aspects of the sequencer resources of a system 1600, in addition to dynamic mapping of logical sequencer addresses to physical sequencers. A mapping manager 1670 may, additionally, manage the binding between a T-sequencer 1640 and one or more S-sequencers 1640 in a meta-processor 1650. In addition, a mapping manager may manage the sequencer state context and the sequencer capability descriptor.

For a multi-sequencer system that supports sequencer-aware instructions, the size of the logical sequencer address space (that is, the total number of distinct logical sequencer addresses that can be used in sequencer-aware instructions) may be architecturally defined independent of the number of physical sequencers present for the given system. For example, a 32-bit value may be used to represent a logical sequencer address, irrespective of whether the actual number of sequencers for the multi-sequencer system could be represented with a fewer number of bits. For such example embodiment, k bits, where k=32, may be used to represent up to $2^k=2^{32}$ logical sequencer addresses, regardless of how many physical sequencers the system includes.

When describing a multi-sequencer system architecture, such as that 1600 disclosed in FIG. 16, it may be convenient to use the notion of "k-bit sequencer addressability" to denote the total number of $2^k$ logical sequencer addresses that one thread (such as, e.g., 225 or 226 in FIG. 2) can make reference to on one meta-processor (such as e.g. 1650 in FIG. 16), which has one T-sequencer and ($2^k$−1) S-sequencers. Conversely, a meta-processor 1650 of (1+s) sequencers 1620, 1640 may be referred to as having a log(1+s)-bit addressable sequencer space. Accordingly, FIG. 16 illustrates a multi-sequencer system 1600 where each meta-processor 1650 is said to have 2-bit addressable logical sequencer address space.

Figure 4:
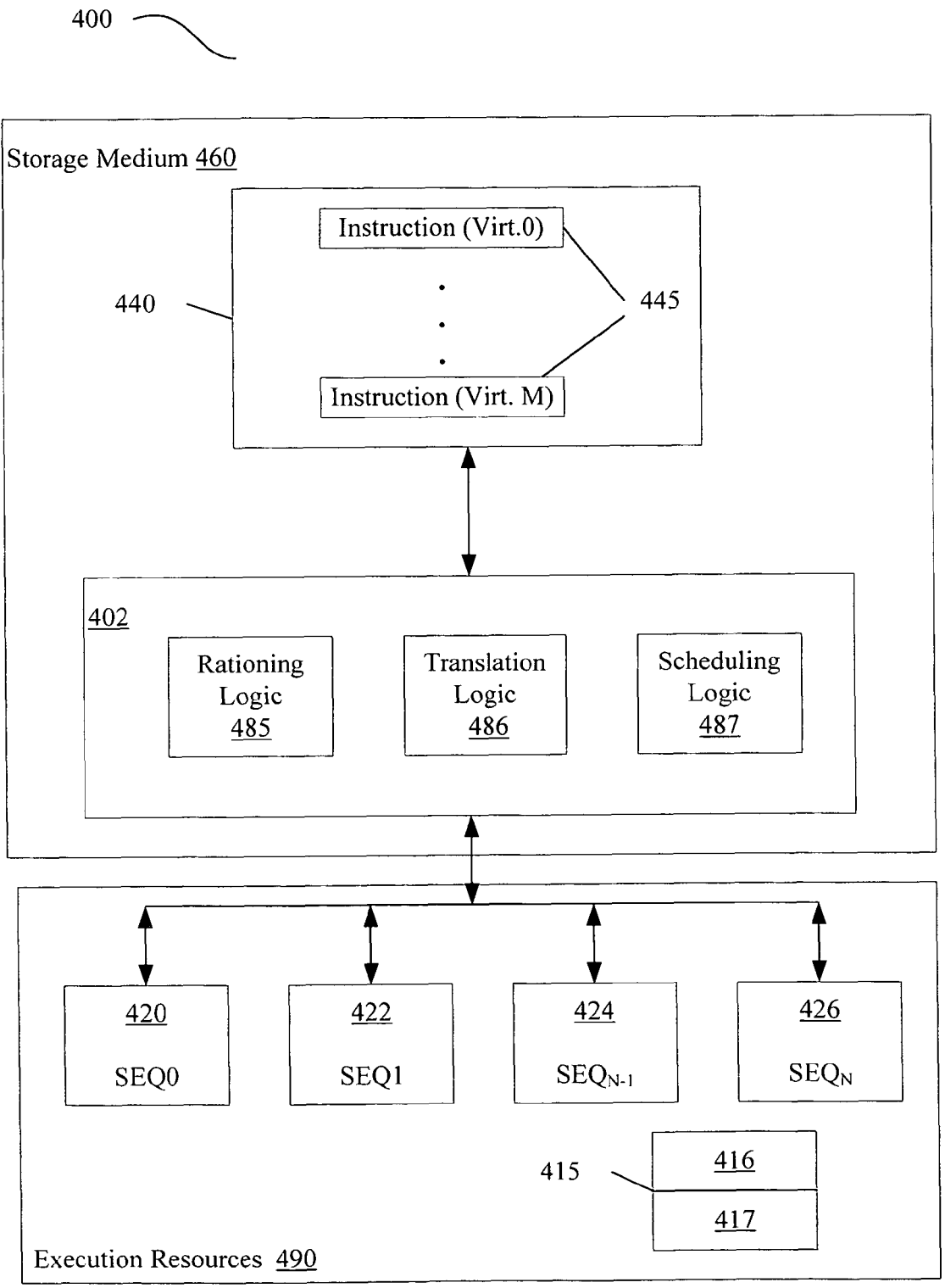
FIG. 4 is a block diagram illustrating at least one embodiment of a multi-sequencer system that includes a mapping manager to manage mapping of logical sequencer addresses to physical sequencer addresses.
Figure 5:
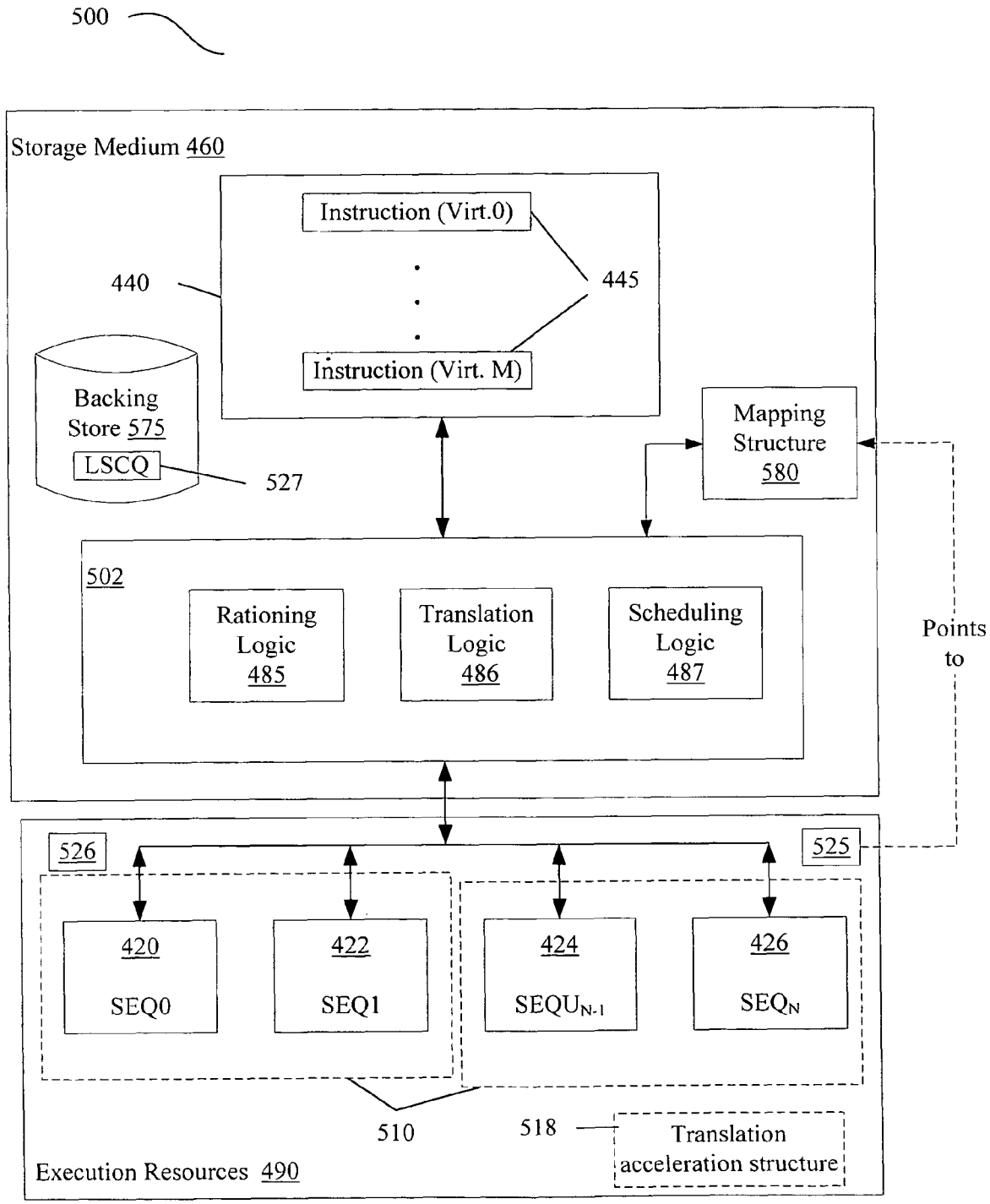
FIG. 5 is a block diagram illustrating at least one embodiment of a multi-sequencer system that includes a mapping manager to manage mapping of virtualized logical sequencer addresses to physical sequencer addresses.

FIGS. 4 and 5 illustrate at least two respective alternative embodiments 400, 500 of multithreading multi-sequencer systems that provide for dynamic mapping of physical sequencers to logical sequencer addresses used in user-level sequencer-aware instructions. Like elements in FIGS. 4 and 5 bear like reference numerals.

For a system 400, 500 that supports dynamic mapping of logical-to-physical sequencers, application programmers do not necessarily know when, and which, physical sequencers will be available to run their application during execution. They may simply use a logical sequencer address in their application program. As is explained above, it may be desirable to allow a program's view of the multi-sequencer system 400, 500 to include a number (M) of logical sequencer addresses ("Virt. 0"-"Virt. M") that actually exceeds the number (N) of physical sequencers 420-426 of the system 400, 500. For such embodiments, the mapping manager 402, 502 may be responsible for mapping M logical sequencer addresses to N physical sequencer identifiers, where M>N. For other embodiments, M=N or M<N, and the mapping manager 402, 502 may perform similar, or potentially simpler, mapping as above described for embodiments depicted in FIG. 3.

Dynamic mapping of the logical sequencer addresses to physical sequencers is handled "behind the scenes" by the mapping manager 402, 502 in a manner that is transparent to the application program. As used in connection with FIGS. 4 and 5, "physical sequencers" are the actual sequencers (see, e.g., 420-426) implemented in a given physical multi-sequencer hardware system.

FIGS. 4 and 5 illustrate that the system 400, 500 may include a storage medium 460 coupled to execution resources 490. The storage medium 460 may be a memory subsystem having various levels of hierarchy which may include but are not limited to various levels of cache memory, microcode or firmware storage such as read only read only memory ("ROM"), system memory such as dynamic random access memory or the like, and non-volatile storage such as flash memory (e.g. memory stick etc), a magnetic or optical disk. As illustrated, the storage medium 460 may store an application program 440 and a mapping manager 402, 502.

A mapping manager 402, 502 may be primarily responsible for sequencer virtualization management tasks. As is explained above, a mapping manager 402, 502 need not necessarily be a software program stored in the storage medium 460, as in the embodiments illustrated in FIGS. 4 and 5. For other embodiments, the mapping manager 402, 502 may exist at any of a variety of levels of hardware and software abstractions. Such abstractions may range from the microarchitectural level, the virtual machine or hypervisor architecture level, OS kernel or driver level, and non-privileged user code level.

A mapping manager 402, 502 may thus perform various virtualization tasks. The mapping manager 420, 520 may include a mapping mechanism as well as a scheduling mechanism. The mapping mechanism may include rationing logic 485 and translation logic 486. The scheduling mechanism may include scheduling logic 487.

The translation logic 486 may attempt to provide address translation for every sequencer-aware instruction that references a logical sequencer address. For a system 400, 500 that provides dynamic mapping of logical sequencer addresses to physical sequencers, translation of logical sequencer addresses (used by an application program 440) into physical sequencer identifiers may be performed by the translation logic 486 for each sequencer-aware instruction's reference to a logical sequencer address.

FIG. 5 illustrates an alternative embodiment of a mapping manager 502 that may utilize a mapping structure 580 in order to maintain mapping information and to perform translation of logical sequencer addresses to physical sequencer identifiers. The mapping structure 580 may, for at least one embodiment, reside in the storage medium 460. Generally, for any instruction that includes as an operand, or otherwise makes reference to, a logical sequencer address, the logical sequencer address is translated by the mapping manager 520 via a look-up in the mapping structure 580. For at least one embodiment, such translation look-up may be performed using system-level support of the operating system. For at least one alternative embodiment, the translation look-up may be performed by application-specific virtualization at the thread level. For yet another alternative embodiment, the translation look-up may be performed by a virtual machine monitor or hypervisor.

FIG. 5 also illustrates that an optional mechanism may be utilized by the translation logic 486 in order to accelerate the translation of a logical sequencer address to a physical sequencer identifier. FIG. 5 illustrates that the execution resources 490 of the system may further include an optional translation acceleration structure 518 to aid in such acceleration. For at least one embodiment, the translation acceleration structure 518 may operate as a cache or buffer to hold a subset of the entries of the mapping structure 580. The use of broken lines for the translation acceleration structure 518 is intended to denote the optional nature of such structure 518.

If the translation logic 486 is not able to locate the physical sequencer after performing a look-up or is not able to locate mapping information for the logical sequencer address, a fault may be triggered. The fault is thus incurred upon a logical sequencer address translation miss (referred to herein as an "LSAT miss"). The LSAT miss fault may trigger control transfer to a handler, such as rationing logic 485, to assign a physical sequencer for the logical sequencer address that caused the fault.

Regarding these faults, the sequencer-aware instructions, such as SXFR, SSAVE, SRTOR etc, may be architecturally defined with faulting semantics so that a failure condition is generated if the translation logic 486 is unable to locate a physical sequencer after look-up or is unable to locate mapping information for the logical sequencer address. Responsive to the fault, control may be transferred to a fault handler, such as rationing logic 485. In other words, an LSAT fault condition may be raised when the translation logic 486 and/or the mapping structure 580 fails in a logical-to-physical sequencer translation lookup.

For various embodiments of the mapping manager 402, 502, the LSAT miss fault may be handled in different manners. For at least one embodiment, where the mapping manager 402, 502 is implemented directly in hardware, the mapping manager 402, 502 may be implemented as a hardware state machine that handles the fault condition.

For another embodiment, the fault triggered by an LSAT miss may be a microarchitectural fault condition that is handled by a microcode flow at the microarchitectural level. The microcode flow may be a sequence of micro-instructions stored in microcode storage such as a ROM portion of the storage medium 460. For at least one embodiment, the LSAT miss fault condition may cause a microcode control transfer to jump to a dedicated microcode flow implementing the rationing logic 486 of the mapping manager 402, 502.

For yet another embodiment, the fault condition triggered by an LSAT miss may be defined for the architectural privilege level for a virtual machine. The fault condition triggers control transfer to a virtual machine monitor or hypervisor. For such embodiment, an LSAT miss fault condition on a guest software such as a guest operating system may trigger a control transition (such as a "VMEXIT") to the host virtual machine monitor or hypervisor. The virtual machine monitor or hypervisor may implement a mapping manager 402, 502, which then services the fault.

For still another embodiment, the LSAT fault is defined at the architectural privilege level for operating systems, such as ring-0 privilege level in IA32 architecture, analogous to a memory page fault. For at least one embodiment, an LSAT miss may thus trigger a system level fault. Such an embodiment is illustrated in FIGS. 4 and 5. For such embodiment, the sequencer address translation fault can lead to control transfer to the mapping manager 402, 502 software handlers at the system level in the OS kernel or device driver. The system privilege level may sometimes also be referred to interchangeably as the supervisor privilege level in some architectures. Such system level LSAT miss fault may be akin, for instance, to a memory page fault that is triggered on a page miss for a load instruction. Responsive to the system level LSAT fault condition, the mapping manager 402, 502, which may be an operating system or a device driver handler, may be invoked to service the fault.

For still another embodiment, the LSAT fault condition may be defined at the architectural privilege level that is associated with the user level or non-supervisor level code (such as ring-3 privilege level in IA32 architecture). For example, the fault condition may be defined as a user-level fault-like type of "yield event" that, when it occurs, may trigger a transfer of control to user-level handler code that implements the rationing logic 486 of the mapping manager 402, 502. For such embodiment, the LSAT miss fault condition may be serviced by the same user program that included the fault-inducing sequencer-aware instruction.

For one or more of the embodiments discussed above, the fault incurred upon a logical sequencer address translation miss (referred to herein as an "LSAT miss") during execution of a sequencer-aware instruction may be handled in either a synchronous or asynchronous fashion. For an asynchronous approach, the sequencer miss may trigger a fault condition, as described above, and may be serviced such that the fault acts as an asynchronous event that triggers transfer of control to the mapping manager 420, 520 or, more specifically for at least one embodiment, to handler code that includes the rationing logic 485. The fault-handling is event-driven (occurs upon an LSAT miss) and the corresponding control transfer to the fault handler is asynchronous in nature.

However, for at least one alternative embodiment, the architecture may define a non-faulting variant of the sequencer-aware instruction. The LSAT miss, rather than causing a fault that causes asynchronous control transfer to a handler, may be logged for later synchronous handling. The miss may be logged, for example, by the setting of a "poison bit" or other miss indicator. In such case, the miss indicator may be checked by software later during execution. If the miss indicator is detected as set, the miss may be handled at that time. In this manner, the fault condition as indicated in the miss indicator may be handled synchronously.

For such embodiment, if execution of a non-faulting sequencer-aware instruction incurs an LSAT miss, the instruction does not generate an architectural fault. Instead, the miss may be logged for later processing and the instruction completes execution. For such embodiment, the miss may be logged as part of the architectural state, in a manner similar to setting a condition bit(s). The one or more bits of the architectural state that is/are set to log an LSAT translation miss may be referred to as a "poison" state. For at least one embodiment, the architectural state representing the "poison" state might be of more than 1 bit. For at least some such embodiments, additional information may be encoded in the multi-bit state, in addition to whether a LSAT miss has occurred, such as particular diagnosis information or hints indicating potential cause of the LSAT fault condition, and/or some information about the sequencer instruction that caused the fault condition.

For non-faulting embodiments, software may inspect the poison state after completion of retirement for the non-faulting sequencer-aware instruction. If a translation miss has been logged, the software may perform synchronous control transfer to a handler that may then handle the translation miss fault. For at least one embodiment, the behavior for the non-faulting variant of a sequencer-aware instruction is somewhat analogous to the usage model of LD.S and CHK.S in the architecture of Itanium® and Itanium® 2 microprocessors available from Intel Corporation, where the LD.S instruction may probe for memory page fault, yet won't cause a page fault even upon incurring failure in the virtual memory translation. Instead, LD.S completes instruction execution but sets a poison bit (called NAT bit). The poison bit may be inspected by the CHK.S instruction later in the user application software, which may cause control transfer to a user-level handler.

In sum, for many different embodiments, when the translation logic 486 is unable to locate a physical sequencer or to locate mapping information for a logical sequencer address that has been specified in a sequencer-aware instruction (referred to herein as a "LSAT miss"), the faulting behavior may be either an asynchronous architectural event that triggers control transfer to a fault handler or may instead cause logging of the poison state, which can be inspected by software synchronously. Such fault behaviors may be defined for different privilege levels (such as, e.g., virtual machine monitor and hypervisor level, system privilege level, and user-level), in different embodiments.

For both the FIG. 4 and FIG. 5 embodiments 400, 500, the mapping manager 402, 502 may also, in addition to translation, perform mapping management. For at least one embodiment, at least part of the mapping management may be performed by rationing logic 485. Rationing logic 485 may be invoked, for example, when an LSAT miss is encountered. The rationing logic 485 may map a physical sequencer to a logical sequencer address specified in a sequencer-aware instruction. A logical sequencer that is mapped to a physical sequencer is referred to herein an "active logical sequencer", and in turn, the corresponding physical sequencer may be called a "dirty physical sequencer". A physical sequencer that is not mapped to a logical sequencer may be referred to as "available" or "idle" or "free".

For at least one embodiment, the rationing logic may vacate an active logical sequencer's context from the corresponding dirty physical sequencer to a backing store (elaborated below in connection with FIG. 7) and then give the resulting available physical sequencer to the logical sequencer whose access just has incurred the LSAT miss. Such context swapping actions may be taken by the rationing logic 485, for example, when no additional physical sequencers are idle and available for mapping.

That is, the execution resources 490 include a finite number, N, of physical sequencers 420-426 on which the mapping manager 402, 502 can map and schedule M logical sequencers for execution. Each active shred (such as, e.g., 280 and/or 282 in FIG. 2) scheduled by an active user thread (such as, e.g., 225 in FIG. 2) on a logical sequencer needs a physical sequencer on which to run. Accordingly, the mapping manager 402, 502 may manage the allocation and mapping of physical sequencers to the logical sequencers in order to make forward progress in executing the shreds that are scheduled to these logical sequencers.

In performing the mapping and allocation function described above, the rationing logic 485 of mapping manager 402, 502 may assign physical sequencers (420-426) to be mapped to logical sequencer addresses. The rationing logic 485 strives to maximize sequencer utilization by 1) subdividing sequencers to accommodate multiple shreds from the same thread, as well as multiple threads from multiple processes and 2) allocating the sequencers efficiently in order to map as many frequently-referenced working sets of logical sequencers into physical sequencers as possible. The rationing logic 485 may use any of several approaches to manage virtual-to-physical sequencer mapping. Such approaches may include base and bounds, segmentation, paging, or the like. Such list is not intended to be exhaustive, but rather an illustrative listing.

Base and Bounds.

The mapping manager 402 illustrated in FIG. 4 may support a base and bounds approach to manage virtual-to-physical sequencer mapping. For such embodiment, the mapping manager 402 accommodates a static partitioning approach that designates a static partition of physical sequencers for each thread (or, equivalently, for each meta-processor). The mapping manager 402 may utilize a hardware mapping structure 415 to perform the mapping.

For at least one embodiment, the mapping structure 415 includes at least two registers: a base register 416 and a bound register 417. The base register 416 may hold a base sequencer identifier value for a thread. The bound register 417 may hold a maximum sequencer identifier value for the thread. The bound register value represents the highest valid virtual sequencer address that the thread may access. Together, the base and bound registers 416, 417 define a range of physical sequencers for the thread. The values for the base and bound registers 416, 417 may be loaded by the mapping manager 402 when a thread is loaded or swapped in.

Under the base and bound approach, a thread may only access those physical sequencers that are in the range of physical sequencer identifiers indicated by the values of its base register 416 and bound register 417.

Range checking may be performed on each reference to a logical sequencer address in the thread. For each thread reference to a logical sequencer address, the thread has the illusion that it has access to the logical address range from 0 to the value in the bound register 417. However, the thread physically has access to physical sequencers in the range from: a lower bound represented by the value in the base register 416 to an upper bound calculated as the sum of the value in base register 416 plus value in the bound register 417. The sequencer address is compared with the upper bound value in the bounds register 417. If the address is not within the bounds, a translation fault may be generated to the mapping manager 402.

Segmentation.

An alternative dynamic logical sequencer address management approach that may be supported by the mapping manager 402 may incorporate the base and bounds approach with a segmentation approach. For such embodiment, the execution resources 490 may include a set of base and bounds registers 416, 417 for each "segment." Accordingly, the mapping structure 415 for x segments may incorporate x base registers 416 and x associated bounds registers 417, where each register pair 416, 417 is associated with a "segment."

A "segment" is a logical aggregate block of logical sequencer addresses. Each aggregate block of logical sequencer addresses is called a segment and may be associated with its own base and bounds registers 416, 417. In some embodiments, the base register 416 is called a segment base register, and the bound register 417 is called a segment bounds register. In at least some embodiments, segmentation is used to partition the physical sequencers into distinct groups, each having special capability characteristics, such as, e.g., power performance characteristics (e.g. sequencers in one segment may be faster or slower than those in another segment), or sequencer type (e.g. sequencers in one segment may be mapped as T-sequencers, while those from another segment as S-sequencers).

Paging-Based Logical Sequencer Address Management.

FIG. 5 illustrates an embodiment of a mapping manager 520 that utilizes a paging-based approach for managing the dynamic mapping of logical sequencer addresses.

FIG. 5 illustrates that the physical sequencers 420-426 may be organized as small evenly-sized partitions referred to as "frames" 510. Although only two frames 510 are illustrated in FIG. 5, such illustration should not be taken to be limiting. The mapping manager 502 may manage virtual-to-physical mapping for any number of frames. In addition, the frames may include any number of sequencers.

The mapping manager 502 may enforce a paging-based approach where the logical sequencer address space for dynamically-mapped logical sequencer addresses may also be divided into a number of equal-sized partitions referred to as "pages." The number of logical sequencers in a page is the same as that of a frame. Accordingly, the logical sequencer address space is effectively a collection of logical sequencer pages of a given frame size.

A small page may potentially increase the size of a page table, while a large page may potentially lead to a relatively high instance of internal fragmentation. The rationing logic 486 may allocate physical sequencers and map logical sequencers at page level of granularity. For the example embodiment illustrated in FIG. 5, each frame has two physical sequencers.

Architectural support for page-based logical sequencer address space may include a register 525 or other structure to store a pointer to page table. For at least one embodiment, it is anticipated that the page table is maintained in a mapping structure 580 in a storage medium 460 such as, for example, memory. It is also assumed for at least one embodiment that the value in the pointer register 525 will be loaded to indicate the base memory address or location of the page table. Architectural support for page-based logical sequencer address space may also include a register 526 or other structure to hold a value for the page table size.

The paging mechanism may be used to partition the physical sequencers 420-426 into fixed-size partitions of either equal or unequal sizes as the basic unit of sequencer allocation. For equal-sized fixed partitions of sequencers, each partition may be allocated to a thread. Such approach may lead to internal fragmentation, as not all threads may need access to the same number of sequencers. A benefit of such approach, however, is that the placement algorithm utilized by the rationing logic 485 of the mapping manager 402, 502 can be more flexible, since all partitions are of equal size, so it may not matter to which particular available partition a thread is actually allocated.

Use of equal-sized partitions for the paging mechanism allows the use of a simple bitmap to map a small working set of logical sequencers from a large and sparse set of logical sequencer addresses to a small set of physical sequencers. This benefit is not realized in a segmentation approach, where a segment represents a set of contiguously numbered physical sequencers. In a segmentation approach, the mapping manager 402, 502 cannot map only a few disjoint subsets of logical sequencer addresses to the physical sequencers.

Alternatively, pages of a fixed set of varying sizes may be allocated by the mapping manager 402, 502. For such approach, a thread may be allocated the smallest available partition that is big enough for the thread. Because the rationing logic 485 may allocate smaller partitions to those threads that require smaller sequencer blocks, internal fragmentation may be less than with an equal-size fixed-partition approach. That is, it is possible to assign each thread to the smallest available partition within which the thread will fit. This approach can potentially lead to external fragmentation. That is, external fragmentation may occur when, even though the sum of available physical sequencers 420-426 is enough for a thread's physical sequencer requirement, there is not available a single partition of physical sequencers large enough for the thread. Therefore, the rationing logic 485 has less flexibility in the placement algorithm for variable-length fixed partitions than with equal-sized partitions.

Alternatively, the mapping manager 402, 502 may support a partitioning approach in which sequencer partitions can be of variable size and may be generated dynamically. For such approach, the rationing logic 485 may allocate exactly the appropriate number of sequencers for each thread. For a system in which more than one sequencer may be utilized for a thread, dynamic sequencer allocation and deallocation may result in external fragmentation. To avoid such external fragmentation, the mapping manager 402-502 for a system that utilizes a dynamic sequencer partitioning approach may implement compaction. Such compaction has relatively high associated overhead, in that it involves relocation (see, e.g., relocation logic 910 of FIG. 9) of all sequencers' state contexts for one or more threads so that they can be "contiguous" with other allocated sequencers, and so that the free physical sequencers may be left in a continuous block. For at least some embodiment, relocation logic 910 is invoked to relocate and remap the sequencer to meet certain capability requirement that is associated with the logical-to-physical sequencer mapping. For example, for one embodiment, a logical sequencer can be associated with a capability descriptor requiring a remapping whenever the underlying physical sequencer exceeds a certain thermal threshold. For at least one embodiment, the resulting relocation operation performed by 910 is sometimes referred to as "sequencer hopping".

The rationing logic 485 of a mapping manager 402, 502 for a system that utilizes dynamic sequencer mapping may embody any of several mapping techniques. These mapping techniques may be employed for any unit of allocation, such as individual physical sequencers, segments, pages, etc. A partial listing of such approaches is set forth below. However, one of skill in the art will appreciate that rationing logic 485 may additionally take a sequencer's capability attributes into account when performing logical-to-physical sequencer mapping. A further discussion of such capability-attribute-based mapping considerations is set forth below in connection with FIG. 13.

Generally, mapping algorithms utilized by rationing logic 485 for a system that follows a dynamic sequencer allocation and mapping approach may include the following, although such list is not intended to be an exhaustive list:

a. Best-Fit Algorithm. The mapping manager 402, 502 scans all free partitions of physical sequencers and chooses the partition of physical sequencers that is closest in size to that needed for the requesting thread. Such algorithm can result in a relatively close fit, and therefore efficient use, of actual sequencers—the smallest available partition that is big enough may be allocated for a thread.

b. First-Fit Algorithm. The mapping manager 402, 502 selects the first available partition of sequencers that is large enough.

c. Next-Fit Algorithm. The mapping manager 402, 502 scans the partitions of sequencers starting from the location of the last prior allocation, and chooses the next available partition that is large enough.

Regardless of how sequencers are partitioned, the mapping 402, 502 may include rationing logic 485 that manages the dynamic mapping of a physical sequencer, or partition of physical sequencers, to a thread each time that a reference to a logical sequencer address in a first program incurs a LSAT miss. Subsequent references of the logical sequencer address by the program may be translated by translation logic 486 without incurring an LSAT miss.

While some of the partitioning schemes discussed above may, on the surface, seem similar to known memory management techniques, the application of such techniques to sequencers involves unique challenges. In contrast to register and memory virtualization schemes, sequencers do not simply involve the spatial context of data storage. Instead, each sequencer is an execution resource that involves many more properties and, therefore, more complex considerations.

To further illustrate at least some of the unique features of physical sequencers as a dynamically-mapped resource, the following discussion refers to a physical sequencer as a basic unit of sequencer allocation. One of skill in the art will recognize, however, that the following discussion also applies to other allocation units, including segments and/or frames of physical sequencers.

A thread may include multiple sequencer-aware instructions. We use the value Y to reflect the number of unique logical sequencer addresses referenced in these instructions in a thread. The mapping manager 402, 502 may dynamically map a physical sequencer to each of the Y logical sequencer addresses of the thread. For a thread that includes Y total number of unique logical sequencer addresses, the thread may make forward progress as long as there is at least one physical sequencer allocated for the thread. The mapping manger 402, 502 may accomplish this by multiplexing multiple (Y) logical sequencer contexts on the single physical sequencer. In other words, during a thread's quanta given by the OS, the mapping manager 402, 502 may alternately map each of the thread's Y multiple sequencer contexts to Z physical sequencers, where Z can be just 1. This multiplexing may be performed for any number of Y logical sequencer addresses and Z physical sequencers, where Y>Z.

For at least one embodiment, to handle the Y>Z multiplexing situation, a multi-sequencer multithreading system 500 may include a logical sequencer context queue ("LSCQ") 527. For at least one embodiment, the LSCQ 527 may be a data structure. For the embodiment 500 illustrated in FIG. 5, the LSCQ 527 is stored in the storage medium 460, which may be a memory system, and may be part of the backing store 575. For at least one embodiment, the LSCQ 527 includes at least Y-Z entries, and may include up to Y entries. Each entry is capable of holding the context information for a logical sequencer, as well as other information such as capability attribute information, such as sequencer hopping-requirements and sequencer scheduling requirements.

When a thread having Y logical sequencer addresses is multiplexed to run on Z physical sequencers, the mapping manager 402, 502 performs sequencer context switching any time a logical sequencer is switched out, and a new logical sequencer is switched in, to a physical sequencer. During such context switching, the current context of a dirty physical sequencer, which is associated with an active logical sequencer of the Y logical sequencers, is saved to the corresponding entry of the LSCQ 527. Then, the context of the new logical sequencer is copied, or "switched in" to the physical sequencer.

The mapping manager 402, 502 may thus perform a context save operation for the current logical sequencer (the one being switched out) and a context restore operation for the new logical sequencer (the one being switched in) during X>Z multiplexing of logical sequencer addresses to physical sequencers. It is assumed that the mapping manager 402, 502 will save and restore the multiplexed Y logical sequencer contexts to and from, respectively, the LSCQ 527.

When an OS-level thread switch is performed for a first thread, the OS may perform a SSAVE operation to save the contexts of the Z physical processors for the thread, as well as any context information that has been saved to the LSCQ 527 for Y-Z non-active logical sequencer addresses associated with the thread, into the OS kernel save area as the overall thread context. Upon a later thread switch, SRSTOR operation may be performed by the OS kernel to restore the thread context including all Y logical sequencer contexts. Such operations that may be performed by the OS kernel are referred to herein as a virtualized SSAVE and SRSTOR operations. Such SSAVE and SRSTOR operations may be performed by the OS. For at least some embodiments, the virtualized SSAVE and SRSTOR mechanism can be implemented at different privilege levels, including virtual machine monitor and microcode layers as described above.

During an SRSTOR operation, the OS may restore as many as Z of the thread's Y logical sequencer contexts from OS kernel's thread context save area into the Z physical sequencers now made available for the thread. (Z may be a different number now than when the thread was previously active; at a minimum Z=1). The remainder of the thread's Y virtual sequencer states is stored into Y-Z entries of the LSCQ 527 of the thread. For at least one other embodiment, the SRSTOR operation restores all Y logical sequencer contexts from the kernel thread's context save area into a Y-entry LSCQ 527 during the SRSTOR operation, rather than saving Z logical sequencer contexts directly to the corresponding Z physical sequencers. For such embodiments, the Y logical sequencer contexts may be mapped and scheduled to Z physical sequencers using various strategies. Such strategies may include on demand allocation. For on demand allocation, when a logical sequencer is referenced, it is scheduled out of the LSCQ 527 and the mapping manager 402, 502 tries to locate an idle physical sequencer out of the Z physical sequencers to map to the logical sequencer. If there is no idle physical sequencer, the mapping manager 402, 502 may select a dirty physical sequencer, perform a sequencer context "swap" to save the context into the proper entry for the corresponding logical processor in the LSCQ 527, and then schedule the new logical sequencer to map to the physical sequencer that was just vacated.

Alternatively, during the multiplexing, the mapping manager 402, 502 may, throughout the quanta for the thread, schedule the Y logical sequencers for execution on the Z physical sequencers. The mapping manager 402, 502 may utilize scheduling approach, such as a simple time-based round robin approach, using sub-quanta. Each sub-quantum may be a fraction, or subdivision, of the OS quanta for thread scheduling. Alternatively, the mapping manager 402, 502 may utilize a different scheduling approach, such as an event-driven approach. For the event-driven approach, a logical sequencer may be switched out of a physical sequencer upon incurring a cache miss or other relatively long-latency event. For the event-driven approach, a logical sequencer may also be switched out of a physical sequencer upon incurring an event raised due to capability constraint checking, such as a dirty physical sequencer exceeding a thermal threshold that requires the mapped logical sequencer to be vacated into LSCQ 527 for rescheduling (which may include sequencer hopping).

For at least one embodiment, LSCQ 527 management performed by the mapping manager 402, 502 may be part of the operating system. For such embodiment, the OS may be responsible for managing the LSCQ 527 and for scheduling Y logical sequencer contexts on the Z physical sequencers.

Figure 6:
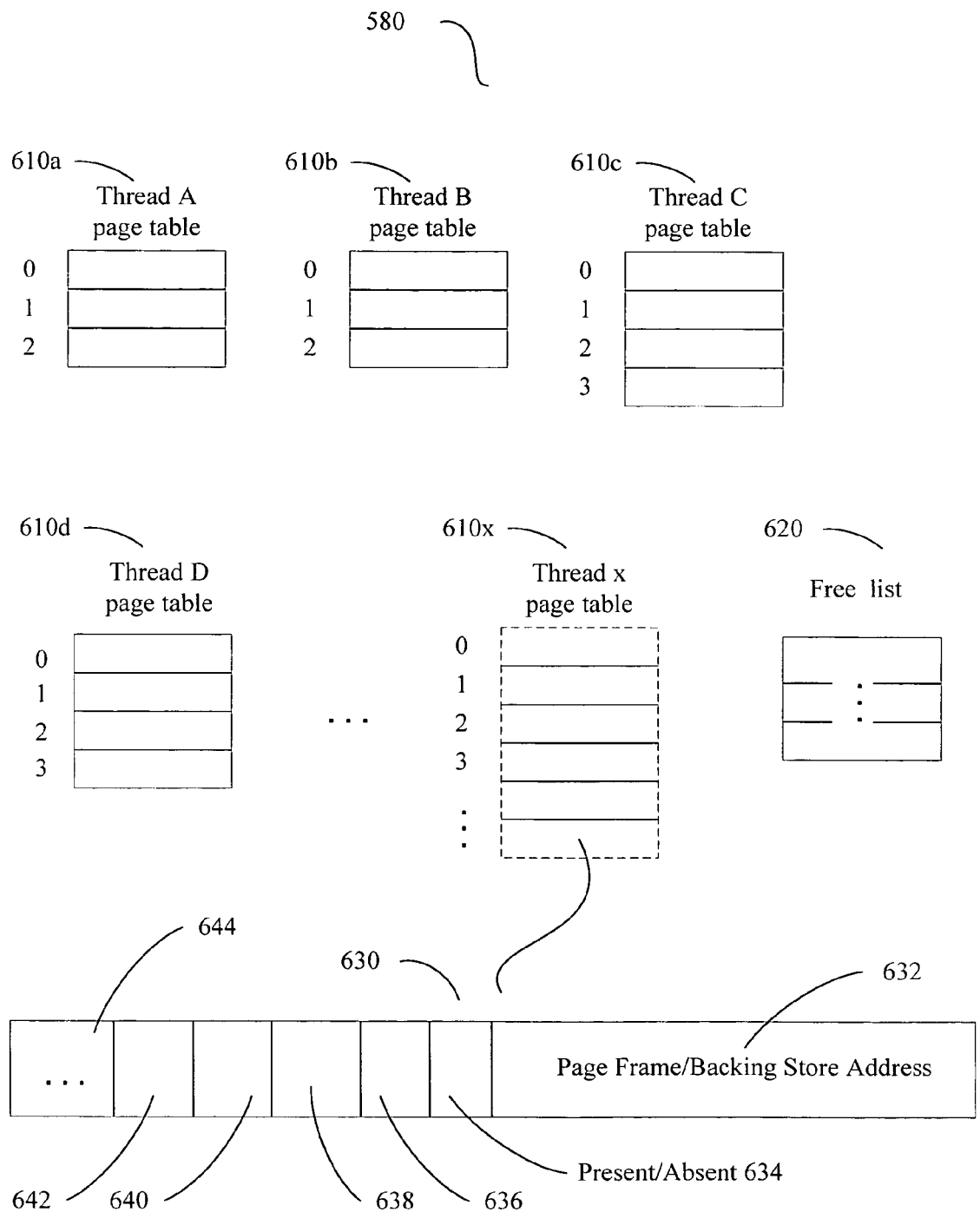
FIG. 6 is a block diagram illustrating further detail for at least one embodiment of a mapping structure.

FIG. 6 illustrates further detail of a mapping structure 580 that may be maintained by the mapping manager 502 (FIG. 5). FIG. 6 is discussed herein with reference to FIG. 5. The mapping structure 580 may be consulted by translation logic 486 (FIG. 5) to perform logical-to-physical sequencer address translation. Entries in the mapping structure may be managed by rationing logic 485 (FIG. 5) when a physical sequencer is allocated or deallocated, including relocation, for a logical sequencer address.

The mapping structure 580 may include a mapping table 610 for each thread. For example, FIG. 6 illustrates mapping structures 610*a*, 610*b*, 610*c*, and 610*d*, which are associated with threads A, B, C, and D, respectively. Although only four specific threads are illustrated in FIG. 6, the FIG. 6 example should not be taken to be limiting. FIG. 6 illustrates that any number, x, of threads may be accommodated by a mapping manager that supports a paging-based logical sequencer address mapping approach (such as mapping manager 502 illustrated in FIG. 5).

For at least one embodiment, the mapping structure 580 may also include a free sequencer frame list 620 via which the mapping manager 502 may keep track of those physical frames that are currently unallocated and are therefore available for allocation when a new logical sequencer address is referenced in a sequencer-aware instruction.

For the example illustrated in FIG. 6, which is meant for illustrative purposes only and should not be taken to be limiting, each mapping table 610 is a sequencer page table that includes an entry for each page of the corresponding thread. Accordingly, the FIG. 6 example includes three pages each for Thread A and Thread B, and includes four pages each for Thread C and Thread D. The sequencer page table 610 may simply be referred to as a "page table" in the following discussion.

FIG. 6 illustrates that each entry 630 of a thread page table 610 may include a sequencer page frame address field 632. The mapping manager 502 may place a value into the page frame address field 632 when a physical sequencer is allocated for the page corresponding to the entry 632. (For at least one embodiment, the value may be placed into the address field 632 by the rationing logic 485 for an initial allocation or by relocation logic (see 910, FIG. 9) for a relocation). The value of the page frame address field 632 indicates a page frame address for the page frame to which the mapped sequencer belongs. For a currently-active thread, the value of the page frame address field 632 may indicate the base address of the physical sequencer frame to which the corresponding thread's page has been allocated. For a thread that has not completed execution but has been swapped out to make room for another thread, the value of the sequencer page frame address field 632 gives the pointer address to the thread's unmapped sequencer page context information saved in the backing store 575 (see, e.g., backing store 575 in FIG. 5)

FIG. 6 illustrates that the entry 630 may also include a present/absent field 634. The value of the present/absent field 634 may identify whether the context information for the thread page is resident on the physical sequencer frame, or whether it resides in the backing store 575. The value of the present/absent field may therefore be utilized by the mapping manager 502 to determine whether the contents of the sequencer page frame address field 632 is the base address of a physical sequencer frame, or whether it is indicates a location of a logical sequencer page in the backing store 575. The value of the present bit may be inspected to trigger a page fault for certain embodiments.

FIG. 6 illustrates that each entry 630 may also include additional fields. For some embodiments, one or more of these additional fields may hold descriptors for capability attributes to indicate properties or constraints associated with the virtual sequencer frame represented by the entry 630. For example, the entry 630 may include a protection field 636 which may be utilized by protection logic and optional sharing logic (see 912, 914 of FIG. 9) of the mapping manager 502.

Of course, various embodiments may include additional, or different, fields than those illustrated in FIG. 6. For example, the entry 630 may include a scheduling field 638. The scheduling field 638 may hold scheduling information for the associated logical sequencer frame. The scheduling information may include, for example, one or more age-based hints to indicate when or how frequently to reschedule the sequencer frame for mapping or remapping including relocation such as sequencer hopping. In addition, or instead, the scheduling information 638 may include capability information indicating one or more characteristics desirable for the physical processor on which the logical sequencer frame is scheduled. For example, the capability-based scheduling information may include desired minimum performance or maximum energy-per-instruction metrics for a target physical sequencer frame.

Figure 10:
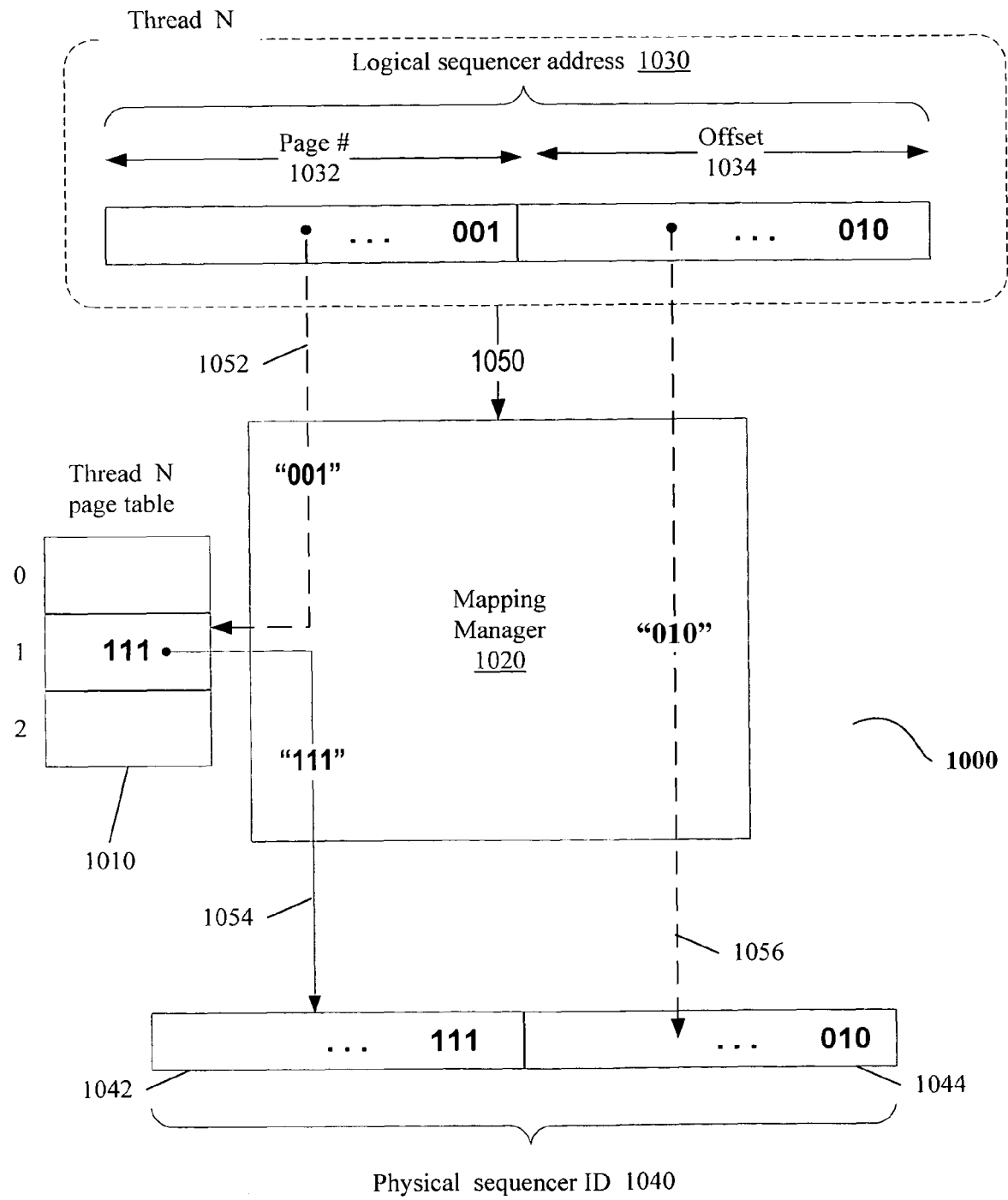
FIG. 10 is a data flow diagram illustrating at least one embodiment of a method for translating a virtual sequencer address to an actual sequencer identifier.

Brief reference to FIG. 10 illustrates at least one embodiment of a method 1000 for translating a logical sequencer address 1030 to a physical sequencer identifier 1040. For at least one embodiment, the method 1000 may be performed by translation logic of a mapping manager (see, e.g., translation logic 486 of mapping manager 502 as illustrated in FIG. 5).

FIG. 10 is a flow diagram illustrating data and control flow for at least one embodiment of a general method 1000 for utilizing a mapping structure (see, e.g., 580 of FIG. 5) to perform logical sequencer address translation. More specifically, FIG. 10 illustrates the use of one or more page tables 1010 as the mapping structure 580 (FIG. 5).

The method 1000 may be used to perform logical sequencer address translation for a multi-threading system that includes multiple sequencers (see, e.g., 420-426 of FIG. 5). The method 1000 may be performed by a mapping manager 1020, along the lines of mapping manager 502 illustrated in FIG. 5. For at least one embodiment, the method 1000 may be performed by translation logic of a mapping manager (see, e.g., 485 of mapping manager 502 in FIG. 5). For at least one embodiment, the mapping manager 1020 may be an operating system program, so that method 1000 is performed by the operating system. For at least one other embodiment, the method 1000 may be performed by a mapping manager 1020 that is a user-level routine, which has been written, for example, by an application programmer. For at least one other embodiment, the method 1000 may be performed by a mapping manager 1020 that is a virtual machine monitor or hypervisor. For at least one embodiment, the method 1000 performed by the mapping manager 1020 may be accelerated through the use of a translation acceleration structure (see, e.g., 518 illustrated in FIG. 5).

It should be noted that the physical sequencers 420-426 referenced above in connection with FIG. 5 need not be symmetric, and their numbers should not be taken to be limiting. Regarding symmetry, one or more of the physical sequencers may differ from one or more of the other physical sequencers in terms of any characteristic or metric of merit. For at least some embodiments, the physical sequencer characteristic or metric of merit may include dimensions, word and/or data path size, topology, memory type and/or size, power consumption, number of functional units, communication architectures (multi-drop vs. point-to-point interconnect), operating frequency, size, instructions per cycle, energy consumption per instruction, thermal characteristic, capability in terms of set of instruction set support, OS-visibility), or any other metric related to functionality, performance, footprint, power, thermal metrics, or the like. These characteristics are for illustrative purpose only and should not be taken to be limiting. They are provided as a partial list of examples in order to illustrate that two physical sequencers in an asymmetric multi-sequencer system may differ as to any one or combination of the above characteristics or metrics. For at least some embodiments, some of these characteristics may be expressed as part of the capability descriptor for the logical sequencers and checked upon logical-to-physical sequencer mapping.

Regarding the number of sequencers, the translation method 1000 may be utilized for any number of sequencers. For example, the translation method 1000 may be implemented for a multi-sequencer system that includes four, eight, sixteen, thirty-two, sixty-four, one hundred twenty-eight, or more sequencers.

FIG. 10 illustrates that, in order to perform translation, the mapping manager 1020, may receive 1050, a logical sequencer address 1030 that includes a logical page number 1032 and an offset 1034. The logical sequencer address 1030 thus effectively maps the use of a logical sequencer address by a thread to a logical page number and an offset within the page. FIG. 10 illustrates that logical sequencer address 1030 may have been specified in a sequencer-aware instruction in a thread, such as Thread N.

FIG. 10 illustrates, generally, that mapping manager 1020 may utilize the appropriate thread sequencer page table 1010 that is associated with Thread N in order to translate the logical sequencer address 1030 to a physical sequencer identifier 1040. In particular, FIG. 10 illustrates that, at 1052, the mapping manager 1020 utilizes the page number 1032 ("001") of the logical sequencer address 1030 as an index into the page table 1010. The value ("111") at the indexed entry of the page table 1010 is placed, at 1054, into a designated page frame portion 1042 of the translated physical sequencer identifier 1040.

FIG. 10 also illustrates that, at 1056, the mapping manager 1020 may copy the offset 1034 ("010") of the logical sequencer address 1030 directly to a designated offset portion 1044 of the translated physical sequencer identifier 1040.

In sum, FIG. 10 thus illustrates that a method 1000 for translating a logical sequencer address to a physical sequencer identifier may include the following: receiving 1050 a logical sequencer address 1030; utilizing 1052 a portion 1032 of the logical sequencer address 1030 as an index into a page table 1010 to determine a page number ("111"); placing 1054 the page number into a designated portion 1042 of a translated sequencer identifier 1040; and copying 1056 another portion 1034 of the logical sequencer address 1030 into an offset portion 1044 of the translated sequencer identifier 1040.

The examples illustrated in FIGS. 6 and 10 should not be taken to mean that the virtual sequencer address translation method 1000 is limited to an approach that is limited to a single level of page tables. For example, FIG. 6 illustrates that the page table entry 630 may include additional bits 640. For at least one embodiment, one or more additional bits(s) 640 may be utilized to indicate, for at least one alternative embodiment, additional page table levels. Accordingly, the mapping manager 1020 may enforce an approach that includes multiple levels of page tables.

Optional Hardware Acceleration for Translation

Returning to FIG. 5, one can see that at least one embodiment of the multi-sequencer multithreading system 500 that supports translation of dynamically-mapped logical sequencer addresses may include an optional translation acceleration structure 518.

For at least one embodiment, the structure 518 may be a sequencer address translation lookaside buffer ("STLB") to cache entries of the page tables or other type of mapping structure 580. Caching of the entries in a hardware structure 518 of the execution resources 490 may accelerate the speed of translation. One reason for the acceleration is that sequencers 420-426 have access to the structure 518 without taking the time to access the mapping structure 580 that resides on the storage medium 460. For example, for the translation example illustrated in FIG. 10, assume that the STLB 518 of FIG. 5 includes the contents of entry 001 of the page table 1010. In such case, the lookup and translation can be performed by STLB logic inside the execution resources 490 (FIG. 5) without having to access Thread N's page table 1010, which may reside in the storage medium 460.

FIG. 11 is a block diagram illustrating at least one embodiment of a format for a translation acceleration structure 1100. The entries of an acceleration structure, such as 518 shown in FIG. 5, may follow the format of the acceleration structure 1100 shown in FIG. 11. The fields 1102-1110 illustrated for entries of the embodiment of the STLB illustrated in FIG. 11 are presented for illustrative purposes only. Additional, or different, information may be cached in the hardware acceleration structure 1100 for other embodiments.

For the embodiment illustrated in FIG. 11, the entries of the structure 1100 includes the following fields: a valid field 1102, a logical page identifier (see, e.g., 1032 of FIG. 10) 1104, and a physical page frame field 1110 (see, e.g., 1042 of FIG. 10).

For at least one embodiment, the base address of a thread-specific sequencer page table (see, e.g., 1010 of FIG. 10) may be loaded into a register 1120 when a context change to a new thread occurs. The register 1120 may be a control register. Any time a thread context change occurs (as indicated by modification of the control register 1120), the contents of the hardware acceleration structure 1100 may be flushed.

Briefly referring to both FIGS. 5 and 11, it should be understood that, for at least one embodiment, each sequencer 420-426 may concurrently execute a different thread. Accordingly, for at least one embodiment an STLB 1100 and a control register 1120 may be designated for each sequencer 420-426. Accordingly, the hardware acceleration structure illustrated in FIG. 5 may include a plurality of STLB's 1110 and control registers 1120, one of each for each sequencer 420-426.

Figure 9:
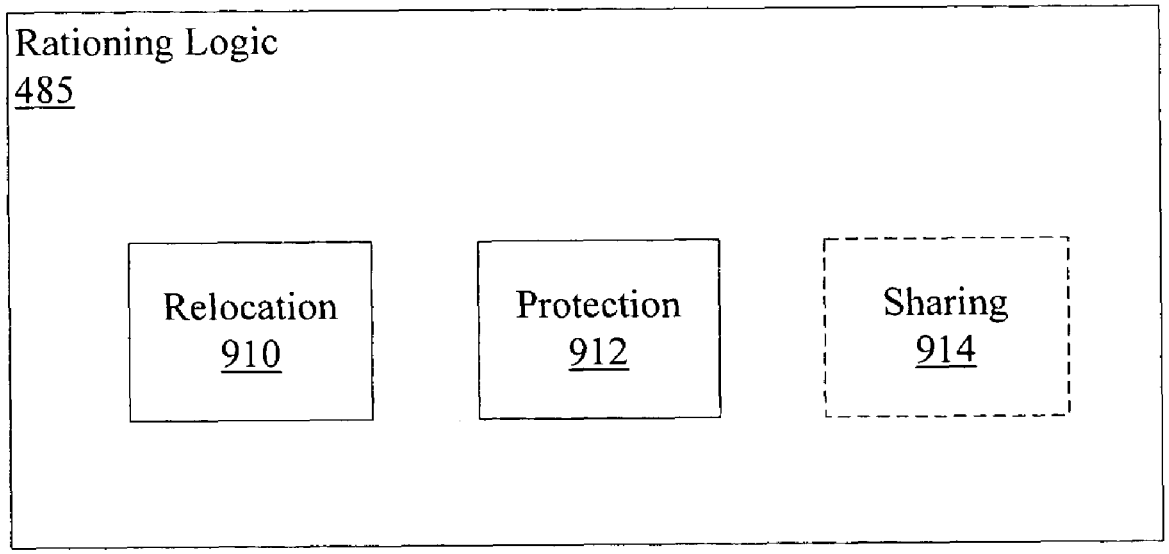
FIG. 9 is a block diagram illustrating at least one embodiment of rationing logic for a mapping manager.

Continued reference to FIG. 5, along with FIG. 9, illustrates that, in order to manage the allocation and mapping of physical sequencers to active threads, the mapping manager 520 may include rationing logic 485. (Like elements in FIGS. 5 and 9 bear like reference numerals.) Rationing logic 485 may include logic to allocate the physical sequencers 420-426 among active threads.

In addition to logic that performs initial assignment of a logical sequencer address to a physical sequencer, FIG. 9 illustrates that the rationing logic 485 may further include logic to perform the following sequencer management functions: relocation, protection, and sharing. Each of the objectives is discussed in further detail in the following paragraphs.

Regarding relocation logic 910, it may be the case that a mapping between a logical sequencer address and a physical sequencer may need to be modified before the thread that initially referenced the logical sequencer address has completed execution. If the mapping manager 502 determines that a second virtual sequencer context should be swapped in to a physical sequencer, the state for the currently-mapped logical sequencer is swapped out to a backing store 575. Such swapping may be performed by relocation logic 910. It may be performed, for example, during compaction.

For such situations, the relocation logic 910 performs logic to manage context and mapping information so that the logical sequencer's associated state may be swapped back in to the current physical sequencer, or another physical sequencer, at a later time. The relocation logic 910 thus includes logic to manage the context information associated with each logical-to-physical sequencer mapping as reflected in the mapping structure (see 580, FIG. 5). In addition, the rationing logic 485 includes logic to modify mappings. For at least one embodiment, such functionality may also be provided by the relocation logic 910. For at least one embodiment, where the mapping manager 502 implements a physical sequencer allocation algorithm that might incur external fragmentation (such as the above Best-fit algorithm), the relocation logic 910 may include logic to 1) relocate physical sequencers belonging to the same thread as a contiguous block and 2) modify the mapping information accordingly.

FIG. 9 illustrates that rationing logic 485 may also include protection logic 912. For at least one embodiment, the protection logic 912 prevents unwanted access to a physical sequencer. For at least one embodiment, this is accomplished by preventing one application thread from referencing a logical sequencer address that is currently associated with another thread. The protection logic 912 may utilize context information for the logical sequencer address associated with a physical sequencer to determine if an attempted access is generated from an instruction associated with the same thread context. If not, the protection logic 912 prevents the access. Thus, the protection logic 912 checks and enforces protection against unwanted access of one sequencer or sequencer frame by another sequencer or sequencer frame during execution.

Finally, FIG. 9 illustrates that the rationing logic 485 may also include sharing logic 914. Such sharing logic 914 is optional, as denoted by the broken lines in FIG. 5. Sharing logic 914 may allow two or more threads to share the same physical sequencer. For embodiments that allow threads to access a common set of one or actual more sequencers, the sharing logic 914 enforces specified parameters and constraints that control the type of sharing that is allowed.

Accordingly, if a different thread attempts to access the logical sequencer address while the first thread is active, protection logic 912 may prevent such access. Alternatively, if sharing is allowed such that multiple active threads may access the same physical sequencer, optional sharing logic 914 may enforce sharing parameters and constraints.

Figure 12:
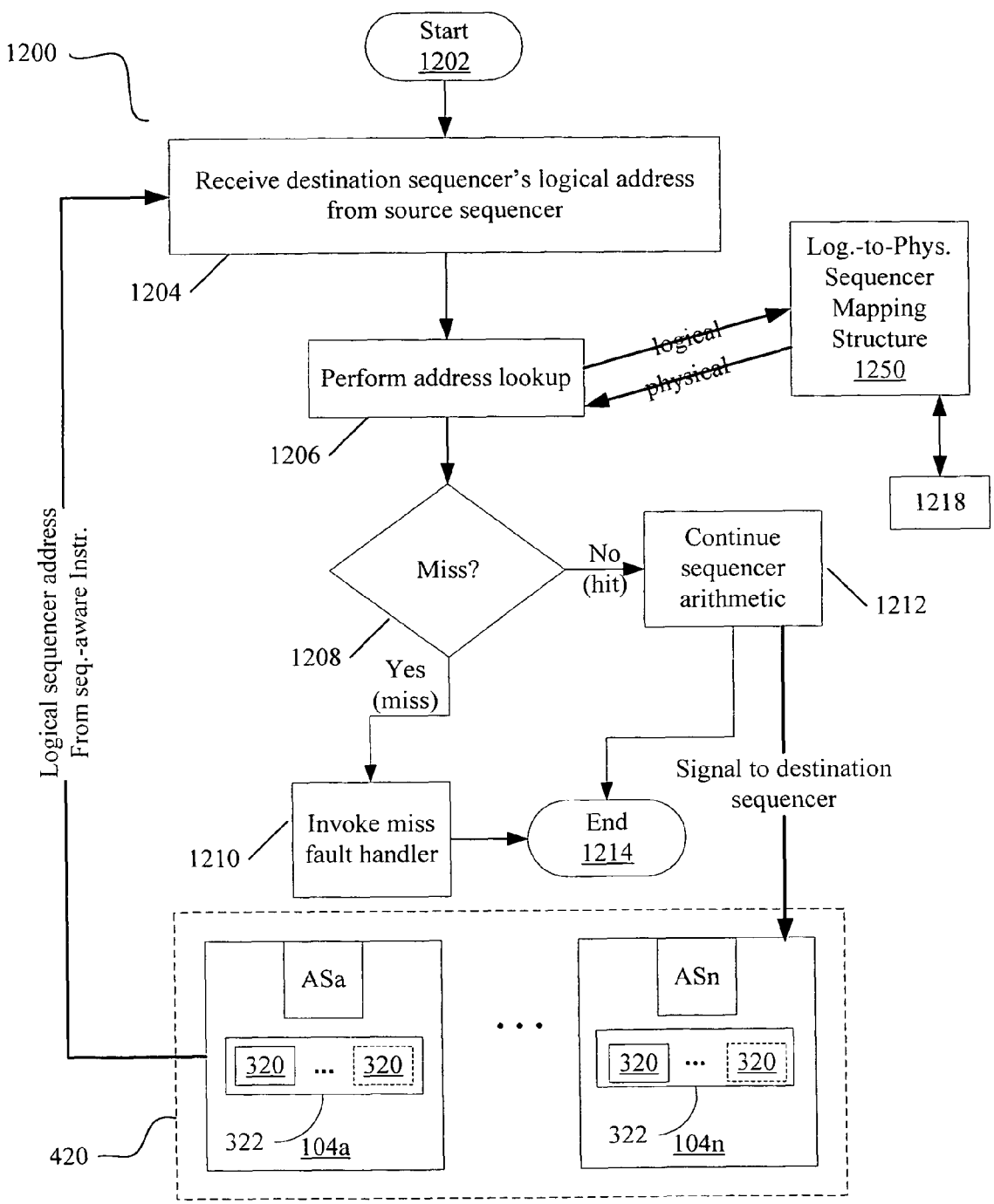
FIG. 12 is a flow diagram illustrating control and data flow for at least one embodiment of a method for sequencer rationing.

FIG. 12 is now referenced for a further discussion of at least one embodiment of sequencer assignment as performed by rationing logic 485. Such assignment may include the following: initial assignment of physical sequencers; re-mapping of physical sequencers; and maintaining/updating mapping information.

FIG. 12 is a flow diagram illustrating control and data flow for at least one embodiment of a method 1200 for sequencer rationing. For at least one embodiment, the method 1200 may be performed by a mapping manager (see, e.g., 580 of FIG. 5).

More particularly, for at least one embodiment, the method 1200 may be performed by rationing logic (see, e.g., 485 of FIG. 5).

FIG. 12 illustrates that the method begins at block 1202 and proceeds to block 1204. At block 1204 the method receives the destination sequencer's logical address provided as a parameter to a sequencer-aware instruction that executes on the source sequencer $104_a$.

Processing then proceeds to block 1206, where a lookup is performed in a mapping structure 1250. The mapping structure 1250 may be a mapping structure, such as structure 580 illustrated in FIG. 5, which is stored in a storage medium (such as, e.g., 460 of FIG. 5). If the mapping structure 1250 does include a valid entry for the logical sequencer address such that an already-assigned physical sequencer identifier may be obtained, then we say that the lookup 1206 has resulted in a hit. Otherwise, a "miss" has resulted.

For at least one other embodiment, the lookup performed at block 1206 may be initially performed in an acceleration structure, such as structure 518 illustrated in FIG. 5. If a hit is incurred, processing proceeds immediately to block 1212. If a hit is not incurred, the method may then perform, at block 1206, a lookup in a mapping structure that is stored in the storage medium, as explained above.

At block 1208, it is determined if a miss has resulted. In addition to a determination of a miss in the mapping structure (and and/or an acceleration structure) as discussed above in relation to block 1206, processing at block 1208 may determine that a "miss" has resulted, even if a page table entry or acceleration structure entry exists for the specified logical sequencer address. That is, when the contents of the present/absent field 634 of the page table entry indicate that the context information for the specified logical sequencer address has been spilled to the backing store (see block 512 and backing store 550 of FIG. 13), then a "miss" is determined at block 1208.

FIG. 12 illustrates that, as a result of decision box 1208, processing proceeds to block 1210 for a miss and to block 1209 for a hit. For a hit, support for the sequencer-aware instruction is performed at block 1212. For at least one embodiment, the support performed at block 1212 includes sending a signal, for a sequencer arithmetic instruction, to the destination sequencer $104_n$ identified by the physical sequencer identifier that was determined during the lookup at block 1206. As a result of such signal, the desired signaling to the destination sequencer $104_n$ may be accomplished as specified in the sequencer arithmetic instruction. From block 1212, processing ends at block 1214.

FIG. 12 illustrates that processing proceeds to block 1210 if a miss is determined at block 1208. At block 1210, a miss fault handler may be invoked. Processing then ends at block 1214.

Figure 13:
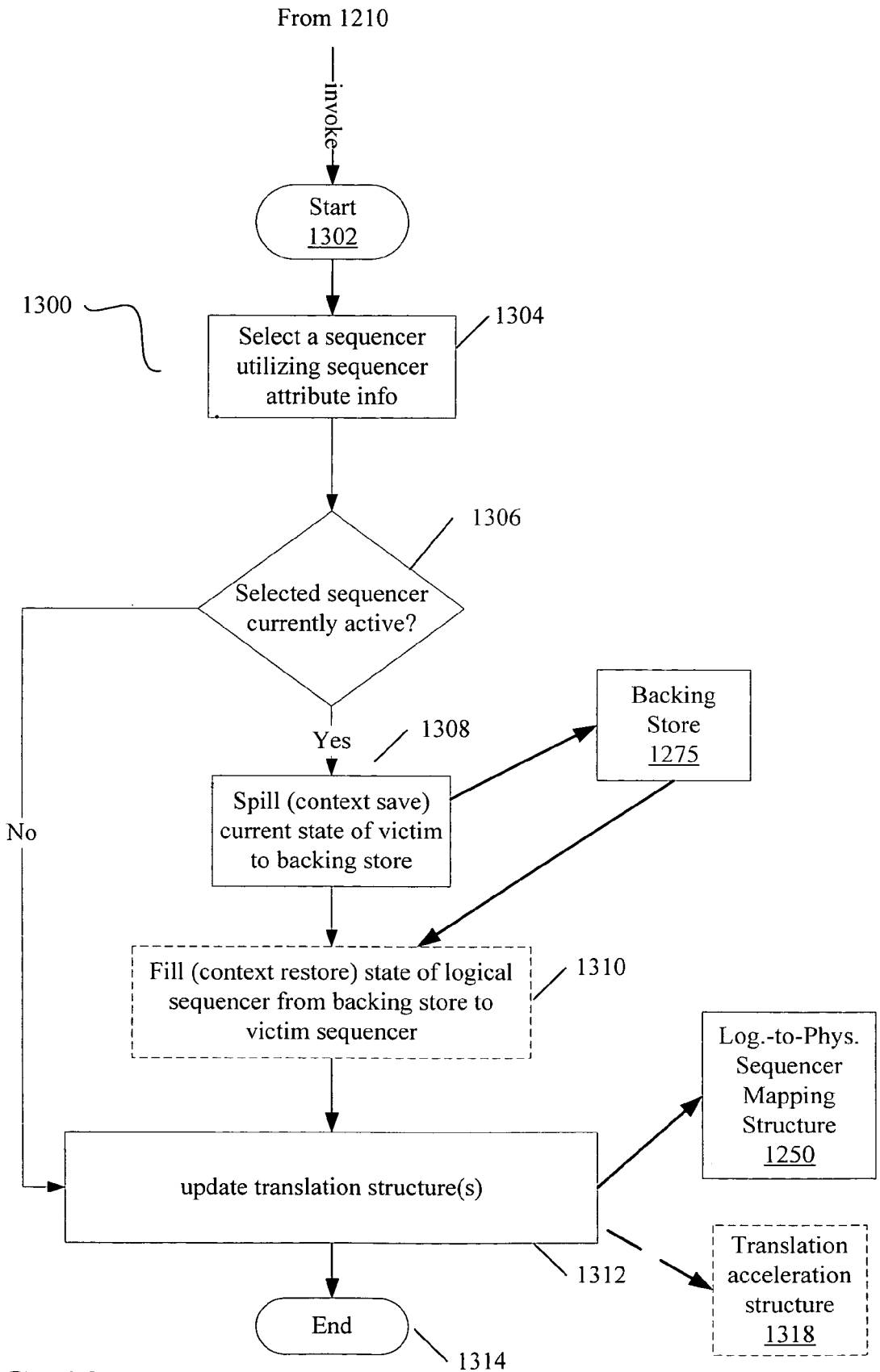
FIG. 13 is a flow diagram illustrating control and data flow for at least one embodiment of a method for handling a page table miss for logical sequencer addresses.

FIG. 13 is a flow diagram illustrating control flow and data flow for at least one embodiment of a method 1300 for miss processing that may be invoked as a result of block 1210 processing (see FIG. 12). One of skill in the art will understand that, rather than directly invoking a fault handler at block 1210, a sequencer page fault may be tripped at block 1210. For such embodiment, a fault handler may be invoked as a result of the fault tripped at block 1210; the fault hander may in turn invoke the method 1300 illustrated in FIG. 13.

FIG. 13 illustrates that the method 1300, which may be performed by rationing logic 485, is generally to assign a physical sequencer for the logical sequencer address received at block 1204 of FIG. 12. Before further discussing FIG. 13, it should be noted that, for at least one alternative embodiment, the method 1300 of FIG. 13 may also be invoked for situations other than a "miss" as detected at block 1208 of FIG. 12. For at least one embodiment, the method 1300 may be invoked so that the rationing logic 485 may perform capability-attribute-based monitoring, enforcement and optimization for physical sequencer allocation. Such capability-attributed based monitoring might detect a violation condition and consequently result in a "miss" condition.

As a distinct architectural resource, an addressable logical sequencer 420-426 differs from an addressable logical memory location in both spatial and temporal attributes. Spatially, a logical sequencer address as used by an application program includes context state information for the register states for a given single-sequencer instruction set architecture. (See, for example, architectural states, AS, shown in FIG. 1). Temporally, a logical sequencer address corresponds to a distinct computation stream of control flow that can have varying degrees of timeliness (e.g., scheduling) requirements.

Accordingly, the mapping from logical sequencer address to physical sequencer address concerns not only allocation of a physical sequencer to which can be mapped a logical sequencer context, but also concerns allocation of a time quanta to run the logical sequencer in a way to ensure forward progress of the program using the logical sequencer to run shreds. For at least one embodiment, the temporal requirement, as a scheduling hint in field 638, can be represented in a logical sequencer descriptor 630, and may cause a time-based periodic activation of the method 1300 to remap the corresponding logical sequencer addresses from one set of physical sequencers to another set. For at least one embodiment, the remapping of M logical sequencer contexts to N physical sequencers may implement a round-robin scheduling policy that may periodically and serially rotate M logical sequencer contexts through N physical sequencers. For at least one embodiment, the scheduling quanta during which a logical sequencer runs on a physical sequencer before getting swapped out is a subdivision of the OS quanta that a thread is allotted by the OS. This policy can ensure overall forward progress of all logical sequencers in a thread.

FIG. 13 illustrates that state information for logical sequencers is subject to spilling 1308 (save) to and filling 1310 (restore) from a backing store 1275. The backing store 1275 may be any storage structure, including memory.

For at least one embodiment, the logical sequencer state information that is subject to spilling 1308 and filling 1310 may include context information. Such context information may include, for example, all register states for architecturally-defined registers on the sequencer. For at least one embodiment, the logical state sequencer information may also optionally include temporal information related to scheduling, such as minimum required quanta and/or desired frequency for rescheduling.

In addition to this information, rationing logic (see, e.g., 485 of FIG. 5) of the mapping manager (see, e.g., 502 of FIG. 5) may also have access to certain physical sequencer information related to such sequencer capability attributes and characteristics as temperature, functionality, performance, power, composition of functional units, and sequencer execution state, to name a few.

The method 1300 of FIG. 13 may therefore be invoked in order to allow the mapping manager to take into account such capability attribute-based logical and/or physical sequencer state information when assigning, or remapping, physical sequencers. For example, the method 1300 may be triggered when a physical sequencer's execution state indicates that it is stalled and not making forward progress. Such execution state may occur, for example, when a sequencer has experienced a long-latency event, such as a cache miss, or is waiting for a lock on a synchronization object.

By the same token, when the method 1300 is invoked due to a miss in the page table 1250, physical sequencer attributes may be taken into account in order to inform, enhance, or optimize physical sequencer selection for the assignment and reassignment. For an example of various types of physical sequencer attributes that may be taken into account by rationing logic 485 during execution of the method 1300 illustrated in FIG. 13, we briefly turn to FIG. 14.

Figure 14:
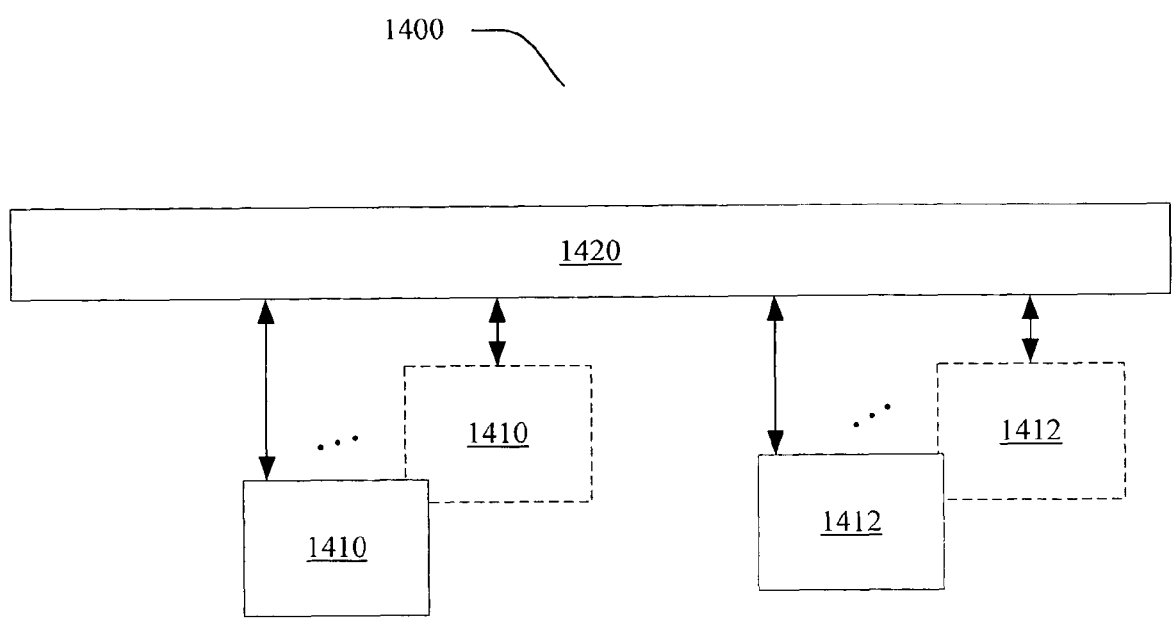
FIG. 14 is a block diagram illustrating at least one embodiment of a multi-sequencer multithreading system that includes asymmetric sequencers.

FIG. 14 illustrates that a multi-sequencer multithreading system 1400 may generally include a mapping manager 1420 and at least two distinct types of physical sequencers 1410, 1412. (For at least one other embodiment, of course, a multi-sequencer multithreading system includes only a single type of sequencer). Dotted lines and ellipses are used in FIG. 3 to indicate that additional sequencers of each type 1410, 1412 are optional.

The system 1400 may include one or more of each type of sequencer. Accordingly, each of the sequencer types 1410, 1412 may be associated with a particular set of capability attributes. Because the sequencer types are distinct, we say that they are "asymmetric"—the attributes may well differ among sequencer types. For at least one embodiment, for instance, the sequencers 1410, 1412 may differ with respect to power consumption metrics. For at least one other embodiment, the sequencers 1410, 1412 may differ with respect to a functionality metric. For example, a first sequencer 1410 may implement all functionalities required by a T-sequencer whose OS can run both system level privilege code and user-level privilege code, while a second sequencer 1412 may only implement functionalities required by an S-sequencer, which only needs to run user-level privilege code and is not required to run system level privilege code. For another example, a first sequencer type 1410 may implement a complete set of functional capabilities for a given instruction set. However, the second sequencer type 1412 may include deprecated functionality, such as implementing only a subset of capabilities for the instruction set. For example, one [deprecated] sequencer may be capable of executing integer and floating point instructions, but cannot execute a single instruction multiple data ("SIMD") set of instruction extensions, such as Streaming SIMD Extensions 3 ("SSE3"). On the other hand, another sequencer may be capable of performing all the instructions that the first sequencer can execute, and can also execute SSE3 instructions.

Rather than, or in addition to, functional metrics, asymmetric sequencer types 1410, 1412 may differ with respect to power consumption and/or temperature attributes as well. For example, the second sequencer type 1412 may require less power or may perform computations more slowly than the first sequencer type 1410. Also, the mapping manager 1420 may also take into account temperature when performing sequencer rationing. For example, if a particular sequencer is approaching a high-temperature threshold, the method 1300 of FIG. 13 may be invoked in order to re-map the virtual sequencer address to a different actual sequencer that is cooler. These capability attributes (power requirements, speed, functional capability, temperature, execution state, etc.) may be available to the software mapping manager 502 and may be utilized to inform the mapping process (sometimes referred to herein as "sequencer rationing") as is discussed in further detail below.

Returning to FIG. 13, the method 1300 is now discussed. FIG. 13 illustrates that the method begins at block 1302 and proceeds to block 1304. At block 1304, a sequencer or sequencer frame to be assigned to the logical sequencer address, which was received at block 1204 of FIG. 12, is identified. Again, the term "sequencer" will be understood to mean either an individual sequencer or a plurality of sequencers in a frame. The terms "sequencer" and "sequencer frame" may thus be used interchangeably in the following discussion.

For various embodiments, various approaches may be utilized to determine a potential sequencer at block 1304. Generally, the determination 1304 may include a traditional selection approach that is then informed by sequencer attribute information.

Figure 8:
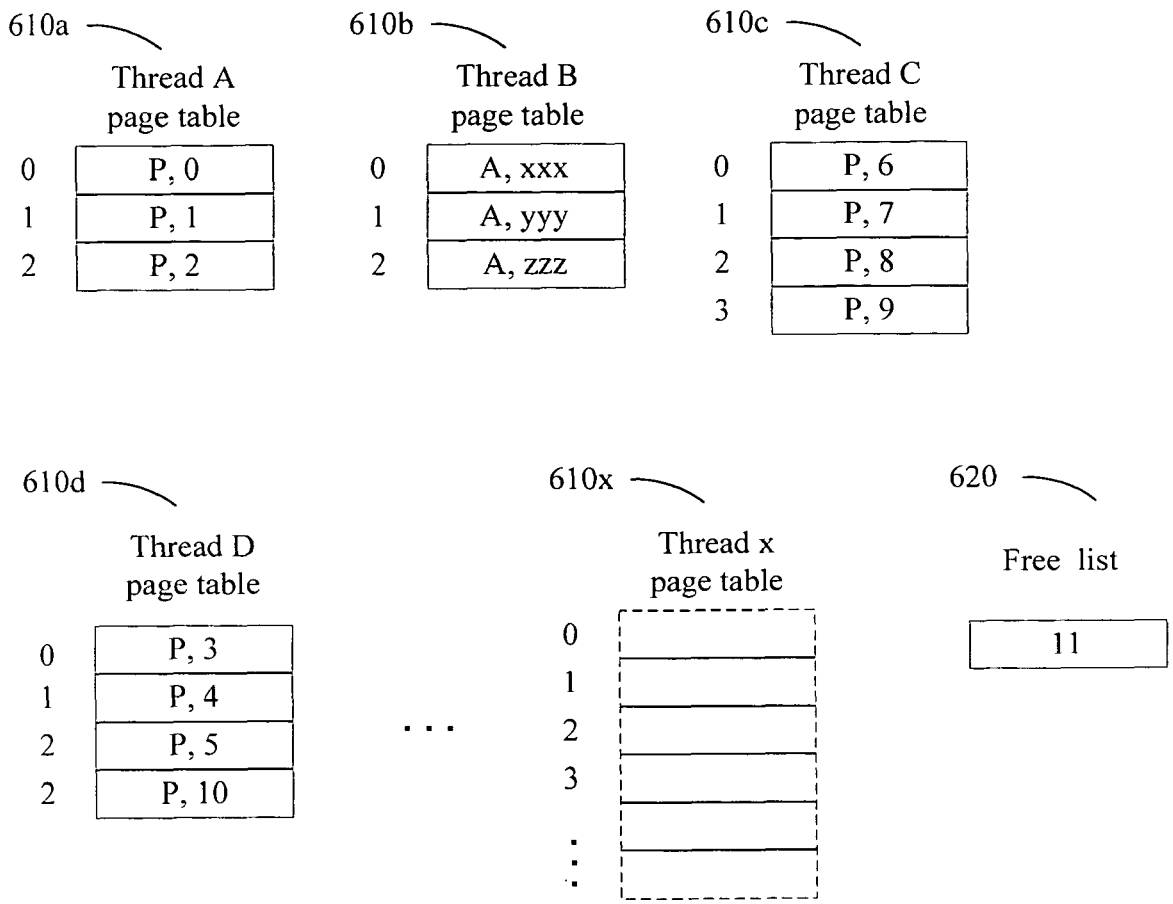
FIG. 8 is a block diagram illustrating the contents of a sample mapping structure for the sample scenario shown in FIG. 7.

For at least one embodiment, a free sequencer is selected at block 1304 if there are currently one or more free sequencers (see, e.g., free list 620 illustrated in FIGS. 6 and 8). If one sequencer is free, it is selected. For at least one embodiment, the attribute analysis, described below, is utilized to determine which of the free sequencers should be selected at block 1304.

If no sequencers are free, then a currently active (sometimes referred to as "victim") sequencer is selected at block 1304. Any known replacement algorithm, aka victim selection algorithm, may be utilized at block 1304 to select an active (or "dirty") sequencer as a "victim". Such algorithms may include, but are not limited to, Not-Recently-Used, First-in-First-Out, Least-Recently-Used, Not-Frequently-Used, Aging, Working Set, Clock, and Working Set Clock ("WS-Clock"). Any such approach may be used to select at block 1304 the sequencer to be evicted to the backing store 1275 in order to make room for an incoming sequencer (the incoming sequencer is the logical sequencer that caused the invocation, at block 1210, of the method 1300).

Whether a sequencer is selected from the free list, or whether a victim sequencer is selected according to a replacement algorithm, the victim selection is optionally informed at block 1304 by a capability attribute analysis.

The capability attribute analysis may be performed at block 1304 in order to determine whether a physical sequencer's current attributes render it a more or less likely candidate for assignment or reassignment. For example, the capability attribute analysis may be utilized to select among entries in the free list in order to select one that is capable of performing a specific set of functions, or has lower power or temperature than others, etc. Alternatively, the capability attribute analysis may be utilized to select among physical sequencers considered by a replacement algorithm, in order to select a physical sequencer that is a more likely candidate for spilling. For example, the capability attribute analysis may indicate that a physical sequencer is a good candidate if it is currently not making forward progress (i.e., is experiencing a stall due to a long-latency cache miss or is waiting to contend a lock on a synchronization object).

From block 1304, processing proceeds to block 1306. At block 1306, it is determined whether the selected victim's state should be swapped out to the backing store 1275. The determination at block 1306 evaluates to "false" if the victim has been selected from the free list. In such case, processing proceeds to block 1312.

However, if the victim sequencer is currently active, processing proceeds from block 1306 to block 1308. At block 1308, the context states for the sequencer are spilled to the backing store 1275. For an embodiment that utilizes sequencer frames, the context states for all sequencers in the victim sequencer frame are spilled to the backing store 1275. Processing then proceeds to block 1310.

At block 1310, the context state for the sequencer (or, alternatively, for all sequencers in the faulting sequencer frame) is retrieved from the backing store 1275. The context information is provided to the physical sequencer that was selected at block 1304. In such manner, the context state for the victim sequencer is spilled 1310 to the backing store 1275 and the context state for the new logical sequencer address is filled 1312 from the backing store 1275 to the victim physical sequencer.

From block 1310, processing proceeds to block 1312. Block 1312 may also be reached directly from block 1306 if the selected physical sequencer is not currently active. At block 1312, one or more translation structures are updated to reflect the new logical sequencer address assignment for the selected physical sequencer. For at least one embodiment, a mapping structure 1250 is updated at block 1312.

For an embodiment that implements the mapping structure 1250 as one or more sequencer page tables, the sequencer page table for the thread that caused the sequencer page fault is updated to reflect the new sequencer mapping for the logical sequencer address to physical sequencer address. For such embodiment, the present field (see 634, FIG. 6) for each page table entry modified at block 1312 is set to indicate that the context information for the page need not be retrieved from the backing store 1275.

In addition, the present field for the page table entry for the sequencer that was spilled to the backing store 1275 at block 1308 is modified to indicate that the context information is stored in the backing store rather than in the physical sequencer.

Finally, for embodiments that utilize an optional hardware translation acceleration structure 1318, such as an STLB 1100 illustrated in FIG. 11, the following may also be performed at block 1312: a translation acceleration structure 1218 is flushed due to a thread context switch. Processing then ends at block 1314.

FIGS. 7 and 8 set forth a specific example in order to further illustrate some of the processing of the method 1300 discussed generally above in connection FIGS. 12 and 13. FIG. 7 illustrates a sample sequencer rationing scenario performed by the rationing logic 485 for the sample threads, Threads A-D, illustrated in FIG. 6. FIG. 7 illustrates a series of actions, AA-AF, performed during the sample sequencer rationing scenario. Such actions reflect a specific example of the general method 1200, 1300 for assignment of physical sequencers, as set forth in FIGS. 12 and 13. Accordingly, FIGS. 7 and 8 are discussed below with reference to FIGS. 12 and 13 as well.

FIG. 7 illustrates a sample embodiment that includes twelve available physical sequencer frames. Action AA of FIG. 7 illustrates an initial state, in which none of the physical frames have yet been mapped to a logical sequencer address.

Action AB of FIG. 7 illustrates the assignment of three sequencer frames, frames 0-2, for the three pages of Thread A. Specifically, FIG. 7 illustrates that, at action AB, page 0 of Thread A (referred to as "A0") is mapped to frame 0. This initial mapping of page 0 of Thread A may be performed in response to the first occurrence of receiving a logical sequencer address that includes page number 1 for Thread A. (See page number 1032 of logical sequencer address 1030 in FIG. 10).

Such logical sequencer address may be received by rationing logic at block 1204 of FIG. 12. Because the page has not yet been mapped to a physical sequencer, the table lookup at block 1206 of FIG. 12 results in a miss, and processing thus proceeds to block 1210 and, subsequently, to block 1304 of FIG. 13. At FIG. 13, a physical sequencer frame is selected for the page. As is illustrated in FIG. 7, sequencer frame 0 is selected at block 1304 for the example illustrated in FIG. 7.

Similarly, action AB of FIG. 7 illustrates that initial mapping for pages 1 and 2 of Thread A may be performed in a similar manner.

FIG. 7 also illustrates that initial mapping of the pages for Thread B may be assigned in a similar manner at action AC of FIG. 7. That is, FIG. 7 illustrates that pages 0, 1 and 2 of Thread B may be mapped to sequencers 3, 4, and 5 at action C of FIG. 7.

FIG. 7 also illustrates that initial mapping of the pages for Thread C may be assigned in a similar manner at action AD of FIG. 7. That is, FIG. 7 illustrates that pages 0, 1, 2 and 3 of Thread C may be mapped to sequencers 6, 7, 8 and 9 at action AD of FIG. 7.

FIG. 7 illustrates that swap out processing may performed by the rationing logic at action AE. Such processing may be performed in response to receiving a logical sequencer address that includes a page that has not yet been mapped. Accordingly, as is discussed above, the logical sequencer address may be received at block 1204. Blocks 1206 and 1210 may then be performed. Reference to FIG. 13 shows that, again, a sequencer is selected for the page at block 1304. For the example illustrated in FIG. 7, there are only two sequencers remaining at the time that a first reference for Thread D is received at block 1204.

However, Thread D includes four logical sequencer addresses and we assume that the scheduling requirement in Thread D's capability attributes therefore require four physical sequencers at a minimum. For at least one embodiment, the minimum number of physical sequencers required for a thread is determined by the rationing logic at block 1304. For at least one embodiment, the number of logical sequencers needed by a thread may be provided architecturally via a capability reporting instruction. Such number may be determined, for example, by executing a capability reporting instruction, such as CPUID instruction, that reports the number of logical sequencer addresses a single thread can access.

Accordingly, at block 1304 an active "victim" sequencer is selected to be swapped out. As is discussed above, sequencer attributes may be taken into account in order to determine which sequencer(s) to swap out. For example, the rationing logic may determine at block 1304 that Thread B is stalled due to long latency cache miss and not making forward progress, and that its sequencer frames should therefore be selected for swapping to make room for Thread D.

FIG. 7 illustrates that the context state for physical sequencer frames 3, 4 and 5 are swapped out to the backing store at action AE. Similarly, FIG. 13 illustrates that a thread context save to the backing store occurs at block 1308. If Thread D had itself been previously active but had been swapped to the backing store 1275 prior to thread termination, then its context would be restored from the backing store 1275 to the vacated physical sequencer(s).

However, for the example shown in FIG. 7, action AF indicates an initial mapping for the pages of Thread D. Accordingly, the context state for Thread D need not be restored from the backing store 1275 but is instead initialized with initial values. Accordingly, block 1310 is denoted with dotted lines in FIG. 13 to indicate that it is not necessarily executed in all cases.

Action AF of FIG. 7 indicates that pages 0, 1, 2 and 3 for Thread D are mapped to physical sequencers 3, 4, 5 and 10, respectively.

FIG. 8 illustrates the contents of the sequencer page tables 610a-610d after action AF of the example scenario illustrated in FIG. 7. FIG. 8 illustrates that the page table 610a for Thread A indicates the mapping of pages 0, 1, and 2 for Thread A to physical page frames 0, 1 and 2, respectively. The value (P")

of the "present/absent" field (see 634, FIG. 6) for each entry of the page table 610a indicates that the context information for the pages are loaded on the physical sequencer frames, not the backing store.

Similarly, FIG. 8 illustrates that the page table 610c for Thread C indicates the mapping of pages 0, 1, 2, and 3 of Thread C to physical page frames 6, 7, 8 and 9, respectively. Page table 610d for Thread D indicates the mapping of pages 0, 1, 2, 3 of Thread D to physical sequencers 3, 4, 5 and 10, respectively. Again, the values of the present/absent field (see 634, FIG. 6) for each entry of tables 610c and 610d indicate that the addresses for the entries indicate physical sequencer frames that hold the current context FIG. 8 further illustrates that the page table 610b for Thread B indicates an absent value "A" in the present/absent field 634 for each entry of the page table 610b. Accordingly, the context for the pages for Thread B may be found at the indicated address (xxx, yyy, zzz, respectively) of the backing store 1275.

For at least one embodiment, the updating of the thread page tables 610a-610b, including the present/absent field, is performed by the rationing logic at block 1312 of FIG. 13.

Finally, FIG. 8 illustrates that the free frame list 620 indicates that physical sequencer frame 11 remains unallocated.

Figure 15:
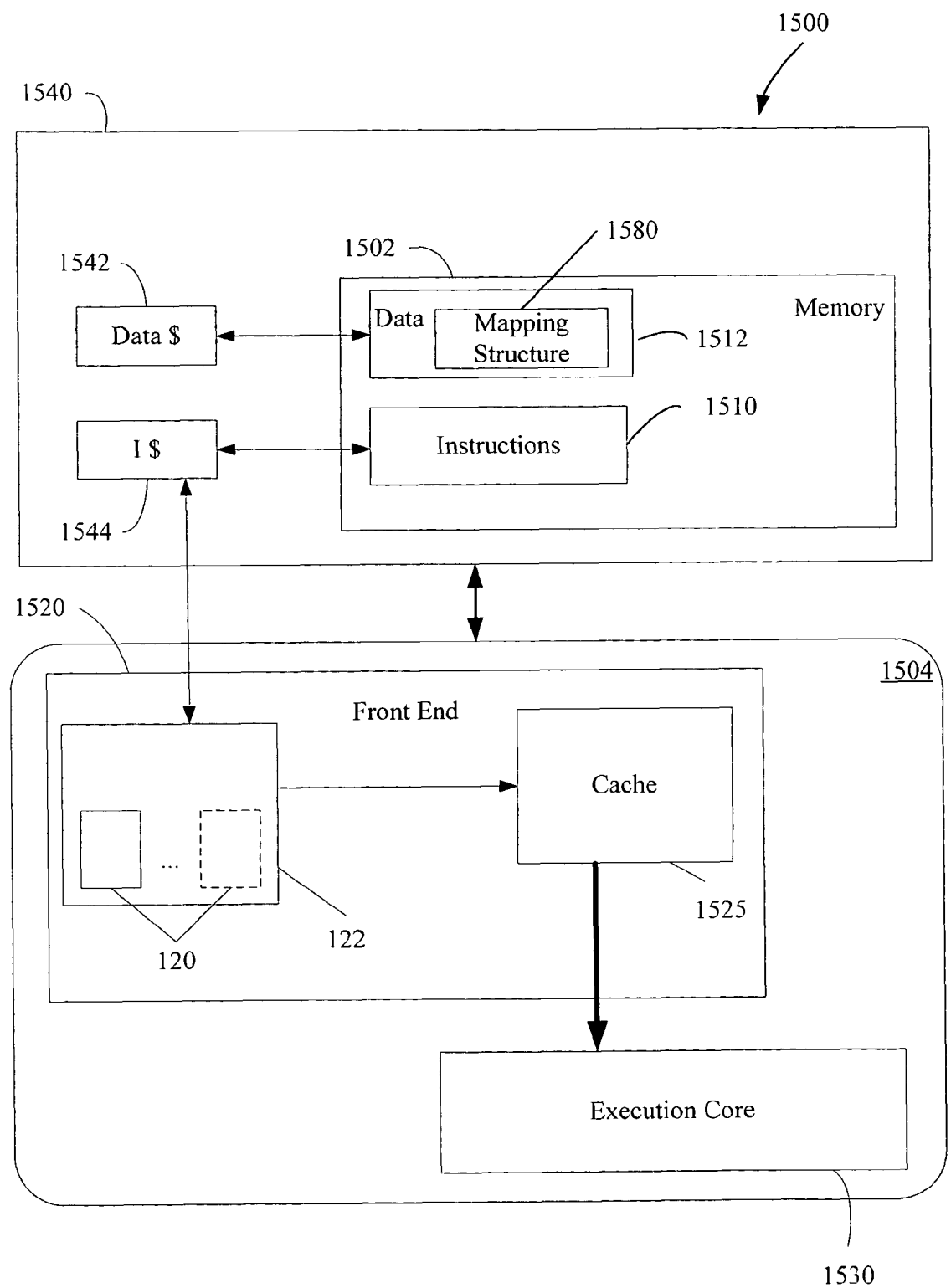
FIG. 15 is a block diagram illustrating further detail for at least one embodiment of a system capable of performing disclosed techniques.

FIG. 15 illustrates at least one embodiment of a computing system 1500 capable of performing disclosed techniques. The computing system 1500 includes at least one processor core 1504 and a memory system 1540. Memory system 1540 may include larger, relatively slower memory storage 1502, as well as one or more smaller, relatively fast caches, such as an instruction cache 1544 and/or a data cache 1542. The memory storage 1502 may store instructions 1510 and data 1512 for controlling the operation of the processor 1504. At least one embodiment of the memory storage 1502 may also include a mapping structure 1580.

Memory system 1540 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1540 may store instructions 1510 and/or data 1512 represented by data signals that may be executed by processor 1504. The instructions 1510 and/or data 1512 may include code and/or data for performing any or all of the techniques discussed herein.

The processor 1504 may include a front end 1520 that supplies instruction information to an execution core 1530. Fetched instruction information may be buffered in a cache 1525 to await execution by the execution core 1530. The front end 1520 may supply the instruction information to the execution core 1530 in program order. For at least one embodiment, the front end 1520 includes a fetch/decode unit 322 that determines the next instruction to be executed. For at least one embodiment of the system 1500, the fetch/decode unit 122 may include a single next-instruction-pointer and fetch logic 120. However, in an embodiment where each processor 1504 supports multiple thread contexts, the fetch/decode unit 122 implements distinct next-instruction-pointer and fetch logic 120 for each supported thread context. The optional nature of additional next-instruction-pointer and fetch logic 120 in a multiprocessor system is denoted by dotted lines in FIG. 15.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Sample system 1500 is representative of processing systems based on the Pentium®, Pentium® Pro, Pentium® II, Pentium® III, Pentium® 4, and Itanium® and Itanium® 2 microprocessors available from Intel Corporation, although other systems (including personal computers (PCs) having other microprocessors, engineering workstations, personal digital assistants and other hand-held devices, set-top boxes and the like) may also be used. For one embodiment, sample system may execute a version of the Windows™ operating system available from Microsoft Corporation, although other operating systems and graphical user interfaces, for example, may also be used.

While particular embodiments of the present invention have been shown and described, it will be obvious to those skilled in the art that changes and modifications can be made without departing from the scope of the appended claims. For example, the mapping structure 580 illustrated in FIG. 5 may be organized in manners other than those discussed above. For instance, the mapping structure 580 may be organized as an inverted sequencer page table, which is a hash-table that has a number of table entries equal to the number of physical sequencer frames. Further, each has table entry of the mapping structure 580 may be associated with a linked list of virtual-page to page-frame mappings.

Also, for instance, the mapping manager (see 502, FIG. 5) may support a hybrid mapping scheme that combines both segmentation and paging. The mapping manger may utilize for this approach a different page table for each segment in a process, so that the number of pages can vary for different segments.

For another alternative embodiment, the mapping manager may take into account not only sequencer attribute information when performing sequencer rationing, but may also take into account timeout actions performed by the physical sequencer itself. That is, a sequencer may be programmed to invoke an event handler upon occurrence of a timeout event. The timeout event may be, for example, any event that indicates that the sequencer is not making forward progress (long latency last-level cache miss, wait for lock on synchronization object, etc.) If a sequencer times out, an event handler for the timeout event may perform a yield in order to place the sequencer's current instruction stream into a "pending queue", and place the physical sequencer back into the free list. Or, for an alternative embodiment that supports a LSCQ as described above, the timeout may cause the current active logical sequencer to be spilled into the LSCQ, and the mapping manager 502 may in turn find a replacement logical sequencer context from the LSCQ. This may be performed by scheduling logic (see, e.g., 487 of FIGS. 4 and 5). The scheduling logic 487 may schedule the replacement logical context to run on the vacated physical sequencer.

The event handler may, instead of or in addition to performing the yield, send a liveness sequencer check to a next virtual sequencer or sequencer page. Effectively, sending such a liveness inquiry provides an aging mechanism (similar to clock or WSClock) to provide that all virtual sequencers for a thread will be paged in a predictable time period.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A computer-implemented method, comprising:
receiving a logical thread execution unit address specified in a user instruction;
utilizing a mapping manager of a computer system to assign the logical thread execution unit address to one of a plurality of physical thread execution units;
receiving the logical thread execution unit address in association with a second user instruction; and
providing an identifier to indicate the assigned physical thread execution unit.

2. The method of claim 1, further comprising:
recording a mapping of the logical thread execution unit address and the identifier of the assigned physical thread execution unit in a mapping structure of the computer system.

3. The method of claim 2, wherein:
said providing further comprises consulting the mapping structure to determine the assigned physical thread execution unit.

4. The method of claim 2, wherein:
the mapping structure resides in a memory storage.

5. The method of claim 4, further comprising:
buffering at least part of the mapping structure in a hardware buffer.

6. The method of claim 5, wherein:
said providing further comprises consulting the hardware buffer to determine the assigned physical thread execution unit frame.

7. The method of claim 1, wherein:
said physical thread execution unit frame includes only a single physical sequencer.

8. The method of claim 1, wherein:
said assigning further comprises determining if at least one of the plurality of physical thread execution units is currently not assigned.

9. The method of claim 1, wherein:
said assigning further comprises assessing one or more attributes of the plurality physical of thread execution units.

10. A mapping manager for a multi-sequencer multithreading system, comprising:
rationing logic, implemented in a computer system that includes multiple hardware processors, to assign a logical processor address specified in a sequencer-aware instruction to a physical processor; and
translation logic, implemented in the computer system, to receive the logical processor address and to provide an identifier associated with the assigned physical processor.

11. The mapping manager of claim 10, wherein:
said rationing logic further comprises sharing logic to allow a first processor to access a second processor under certain predetermined conditions.

12. The mapping manager of claim 10, further comprising:
protection logic to prevent a first processor from accessing a second processor without permission.

13. The mapping manager of claim 10, wherein:
said translation logic is further to receive said logical processor address responsive to a reference in a user instruction.

14. The mapping manager of claim 10, further comprising:
scheduling logic to schedule a set of logical processors for execution on a smaller set of physical processors.

15. A multi-sequencer multithreading system comprising:
a memory system to store a user program;
a plurality of physical thread units capable of concurrent thread execution; and
a mapping manager to map an address for a logical processor specified in an architectural instruction to a physical sequencer frame that comprises one or more of the physical thread units.

16. The system of claim 15, wherein:
said physical sequencer frame includes only one of the physical thread units.

17. The system of claim 15, wherein:
said mapping manager is further to provide an identifier associated with the physical sequencer frame responsive to receiving the logical processor address.

18. The system of claim 15, further comprising:
a logical processor context queue to store context information for the logical sequencer.

19. The method of claim 1, wherein:
said assigning further comprises selecting a victim from among a plurality of active thread execution units.

20. The mapping manager of claim 10, further comprising:
relocation logic to swap context information for a logical processor to a backing store.

21. The system of claim 15, further comprising:
a backing store to store context information associated with the logical processor.

* * * * *